United States Patent
Rickeby

(10) Patent No.: US 12,301,899 B2
(45) Date of Patent: *May 13, 2025

(54) METHODS AND SYSTEMS FOR MAINTAINING SMOOTH FRAME RATE DURING TRANSMISSION OF STREAMING VIDEO CONTENT

(71) Applicant: Sony Interactive Entertainment Inc., Tokyo (JP)

(72) Inventor: Claes Christian Rickeby, Trabuco Canyon, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,728

(22) Filed: Jan. 23, 2024

(65) Prior Publication Data
US 2024/0171637 A1    May 23, 2024

Related U.S. Application Data

(62) Division of application No. 16/725,726, filed on Dec. 23, 2019, now Pat. No. 11,882,188.

(51) Int. Cl.
| | |
|---|---|
| H04N 21/2343 | (2011.01) |
| A63F 13/335 | (2014.01) |
| A63F 13/355 | (2014.01) |
| A63F 13/358 | (2014.01) |
| H04L 47/26 | (2022.01) |

(Continued)

(52) U.S. Cl.
CPC ....... *H04N 21/2343* (2013.01); *A63F 13/335* (2014.09); *A63F 13/355* (2014.09); *A63F 13/358* (2014.09); *H04L 47/26* (2013.01); *H04L 67/131* (2022.05); *H04N 19/146* (2014.11);

(Continued)

(58) Field of Classification Search
CPC ...... H04L 67/38; A63F 13/335; A63F 13/355; A63F 13/358; A63F 2300/538; H04N 19/146; H04N 21/4781
See application file for complete search history.

(56) References Cited

U.S. PATENT DOCUMENTS

| | | | | |
|---|---|---|---|---|
| 5,926,222 A | * | 7/1999 | Nickerson | H04N 19/149 375/E7.157 |
| 2004/0008767 A1 | * | 1/2004 | Ueda | H04N 9/8042 375/E7.145 |

(Continued)

*Primary Examiner* — Malina D. Blaise
(74) *Attorney, Agent, or Firm* — Kilpatrick Townsend & Stockton LLP

(57) ABSTRACT

Methods and system include receiving frames of data generated for an online game, from a server device and encoding the frames using an encoder. Each encoded frame of data is transmitted to a client device over a network, for rendering. A monitoring engine is used to evaluate the data contained in the encoded frame to determine if an amount of data contained in the encoded frame exceeds a maximum data limit specified for a communication channel established between the server device and the client device. When the amount of data contained in the encoded frame exceeds the maximum data limit, a signal is sent to the encoder to dynamically reduce amount of data included in one or more subsequent frames forwarded to the client device for rendering. The adjusting is performed to maintain a frame rate defined for the online game.

18 Claims, 8 Drawing Sheets

---

Frame data Processing:

Content Stream attributes:
Frame speed: 60 frames per second
Maximum Bitrate: 10 Megabits/sec (Mbps)
Maximum Bytes per frame : 10,000,000 / 60 / 8 = 20,833 bytes
Reduced Maximum bytes per frame: 10,000 bytes

| Time | Frame # | Actual frame size | Amt. of Bitrate overrun? | Adjust this frame | Amt of sent debt data included in this frame | Bitrate debt counter/frame debt counter | Frame # visible at the client |
|---|---|---|---|---|---|---|---|
| T1 | Frame 10 | 40,000 bytes | 20,000 bytes | No | 0 | 20,000 / 2 | Frame 10 |
| T2 | Frame 11 | 9,000 bytes | 0 bytes | Yes | 11,000 | 9,000 / 1 | Frame 11 |
| T3 | Frame 12 | 10,000 bytes | 0 bytes | Yes | 9,000 | 0 / 0 | Frame 12 |
| T4 | Frame 13 | 15,000 bytes | 0 bytes | No | 0 | 0 / 0 | Frame 13 |
| ⋮ | ⋮ | ⋮ | ⋮ | ⋮ | ⋮ | ⋮ | ⋮ |

(51) Int. Cl.
*H04L 67/131* (2022.01)
*H04N 19/146* (2014.01)
*H04N 21/478* (2011.01)

(52) U.S. Cl.
CPC .... *H04N 21/4781* (2013.01); *A63F 2300/538* (2013.01)

(56) References Cited

U.S. PATENT DOCUMENTS

| | | | | |
|---|---|---|---|---|
| 2009/0213927 | A1* | 8/2009 | Perlman | A63F 13/30 375/E7.126 |
| 2010/0166062 | A1* | 7/2010 | Perlman | H04N 21/658 382/239 |
| 2011/0064134 | A1* | 3/2011 | Nakagomi | H04N 19/115 375/E7.011 |
| 2014/0094299 | A1* | 4/2014 | Stine | A63F 13/52 463/31 |
| 2018/0184142 | A1* | 6/2018 | Schmidt | H04N 21/6373 |
| 2019/0364302 | A1* | 11/2019 | Perlman | H04N 19/436 |

* cited by examiner

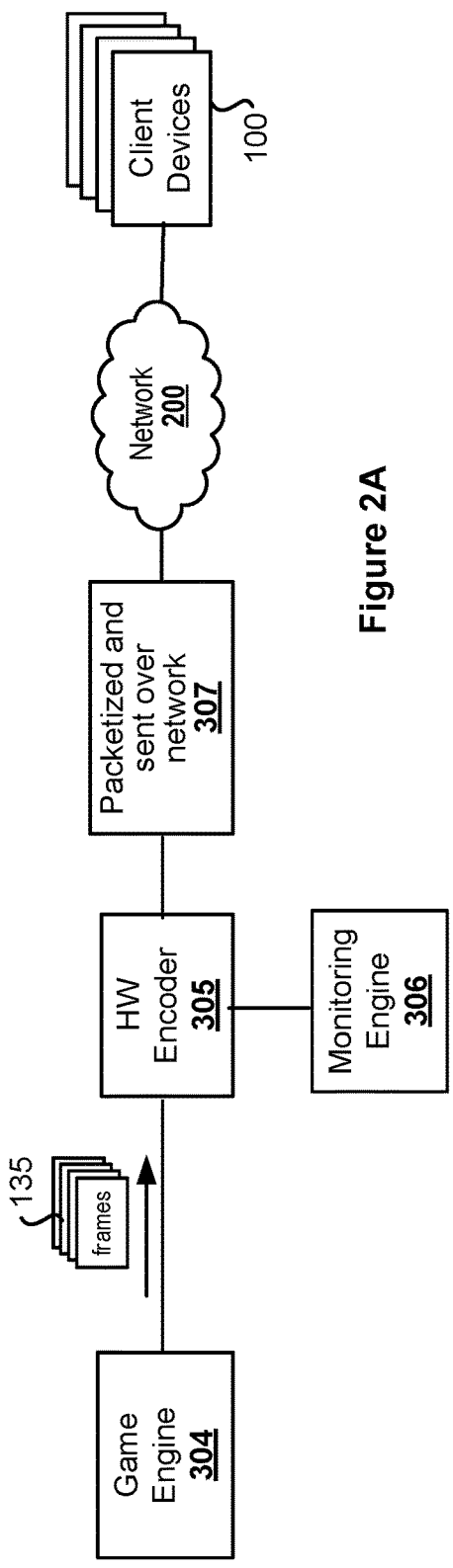
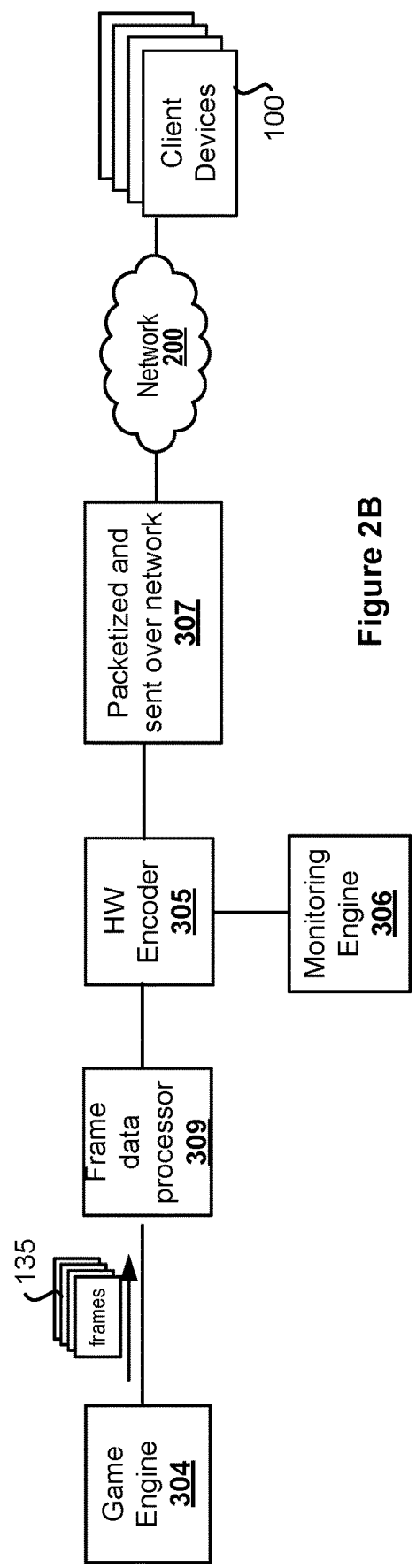
Figure 2A
Figure 2B

Frame data Processing:

Content Stream attributes:
Frame speed: 60 frames per second
Maximum Bitrate: 10 Megabits/sec (Mbps)
Maximum Bytes per frame : 10,000,000 / 60 / 8 = 20,833 bytes
Reduced Maximum bytes per frame: 10,000 bytes

| Time | Frame # | Actual frame size | Amt. of Bitrate overrun? | Adjust this frame | Amt of sent debt data included in this frame | Bitrate debt counter/frame debt counter | Frame # visible at the client |
|---|---|---|---|---|---|---|---|
| T1 | Frame 10 | 40,000 bytes | 20,000 bytes | No | 0 | 20,000 / 2 | Frame 10 |
| T2 | Frame 11 | 9,000 bytes | 0 bytes | Yes | 11,000 | 9,000 / 1 | Frame 11 |
| T3 | Frame 12 | 10,000 bytes | 0 bytes | Yes | 9,000 | 0 / 0 | Frame 12 |
| T4 | Frame 13 | 15,000 bytes | 0 bytes | No | 0 | 0 / 0 | Frame 13 |
| ……… | ……… | ……… | ……… | ……… | ……… | ……… | ……… |

Figure 5

METHODS AND SYSTEMS FOR MAINTAINING SMOOTH FRAME RATE DURING TRANSMISSION OF STREAMING VIDEO CONTENT

CLAIM OF PRIORITY

This application is a divisional of U.S. application Ser. No. 16/725,726, to Claes Christian Rickeby, entitled "METHODS AND SYSTEMS FOR MAINTAINING SMOOTH FRAME RATE DURING TRANSMISSION OF STREAMING VIDEO CONTENT", filed on Dec. 23, 2019, which is incorporated herein by reference in its entirety.

TECHNICAL FIELD

The present disclosure relates to streaming video content, and more specifically to methods and systems for maintaining a smooth frame rate during transmission of streaming video content.

BACKGROUND OF THE DISCLOSURE

With the growing popularity of mobile devices, there has been an exponential increase in demand for streaming content, such as movies, videos, entertainment content, live game content, etc., for user consumption. To keep the users fully engaged, it is essential to provide high-quality video content with minimal latency. In order to provide high-quality video content to a client device with minimal latency, transmission pipelines with good amount of bandwidth need to be available for transferring the streaming content. Further, the streaming content (e.g., video data) needs to be transmitted at a steady frame rate so that the content can be rendered in a smooth and continuous manner at the client device. Typically, the bandwidth for transmitting the streaming content over the network, such as the Internet, is defined (i.e., set) by internet service providers.

Streaming content, such as Video, captures thousands of individual images in video sequence. These images are captured in frames of data. The frequency with which these frames are provided in a given amount of time represents the frame rate. The frame rate affects the way a user perceives motion in the video content. When there is an inconsistency in the frame rate due to one or more frames getting dropped, some of the details of the video may be lost resulting in a choppy video. When the dropping of frames is minimal and infrequent, the quality of the video perceived by the user may not be affected much. However, when there is frequent dropping of frames, a noticeable hitch may be perceived on the screen.

Further, as the technology has improved over time, so has the quality of the generated video and the frame rate. The higher frame rates are used by live streaming content providers (e.g., broadcasters) to provide fast paced action more completely. Examples of such fast paced actions include live sports, such as soccer, football, etc., high intensity online gaming, etc. The improvement in the video resolution and the frame rate places a higher burden on the bandwidth requirements.

The content is encoded using an encoder, prior to transmission. The encoders used for encoding the content before transmission over the internet, can be broadly classified into two main types—hardware and software. A hardware encoder, for example, is a physical computing equipment/device that is configured to directly connect to a network, such as the Internet, encode the video content, and send the encoded video content over the network. A software encoder is a program/programming logic that executes on a computer, establishes the network connection, encodes the video content and pushes the encoded video content over the network.

Irrespective of the type of encoder being used, the encoders are instructed to adhere to a maximum size of data for each frame, when encoding data, wherein the maximum size is defined by the bandwidth available for the communication channel used for transmitting the video data. However, encoders do not strictly adhere to the specified maximum size when generating the frames. As a result, the encoder may from time to time generate frames that are larger than what has been specified. For example, the encoder may generate an I-frame, which is many times bigger than the maximum size specified. The conventional way of handling such large sized frames is to process, encode and transfer the large frame and to drop one or more subsequent frames in order to allow the large frame to transfer, thereby completely ignoring the maximum bitrate specified for the communication channel connection. As stated previously, dropping one frame infrequently may not affect the overall experience of the user but if frames are dropped frequently, a noticeable hitch is perceived on the screen. This noticeable hitch may affect the overall experience for the user. It is in this context that embodiments of the disclosure arise.

SUMMARY

Embodiments of the present disclosure relate to systems and methods for processing data of online games or interactive applications that generate steady stream of content. For example, a gaming engine available on a remote server computing device (or simply referred to herein as "server") executes an online game selected by a user, and generates streaming content. User inputs provided in response to streaming content are used to affect a game state of the online game. The streaming content is encoded using an encoder and transmitted to a client device for rendering. The streaming content includes current state of the online game. Data contained in each encoded frame is evaluated to determine if the data contained within the encoded frame exceeds a content maximum threshold limit defined for a communication channel established between the remote server and the client device. If the data in the encoded frame exceeds the predefined maximum threshold limit, then a counter, such as a "sent debt" counter, is incremented. The sent debt counter identifies the amount of data by which the data contained in the frame exceeds the threshold limit set for the communication channel, and the number of frames that needs to be scaled back to recoup the sent debt. The sent debt counter is queried when a subsequent frame of content is received by the encoder for encoding, wherein the subsequent frame of data is generated following the frame that exceeded the threshold limit. When the sent debt counter is non-zero, the encoder is instructed to scale back amount of data included in the subsequent frame to below a predefined reduced maximum data limit. The reduced maximum threshold limit for the subsequent frame(s) may be driven by the amount by which the first frame exceeded the threshold limit and/or the bandwidth of the communication channel and/or the demands of the online game. The scaling back the amount of data included in subsequent frames continues so long as the sent debt is non-zero. Once the sent debt has been recouped (i.e., the sent debt is zero), the encoder is instructed to resume encoding the subsequent frames received after the frame of data that resulted in incurring the sent debt, at the normal rate defined by the predefined maximum threshold limit.

When a subsequent frame is received, the encoder may evaluate the amount of data contained in the subsequent frame and dynamically reduce the amount of data in the subsequent frame to the reduced maximum data limit specified for the online game, based on a signal received at the encoder. The reduced maximum data limit may be predefined based on the type of online game that was selected for game play. When evaluating the subsequent frame based on the signal received at the encoder, the encoder may determine that the amount of data included in the subsequent frame is less than the reduced maximum data limit. In such cases, the encoder will just proceed to encode the subsequent frame without altering the amount of data contained within the subsequent frame, as the amount of data in the subsequent frame is well within the reduced maximum data limit.

By providing instructions to the encoder to include appropriate amount of data in each frame that is sent to the client device, a smooth and consistent frame rate can be maintained. Maintaining the frame rate results in rendering the relevant content of the online game at a client device without causing any hitch in the rendering. The encoder may reduce the amount of data in the subsequent frame(s) by identifying and retaining certain ones of data that are critical for rendering image(s) contained within the subsequent frame and discarding certain other data included in the subsequent frame that are non-critical. Alternately, the encoder may reduce the data using a compression technique.

In some instances, a frame data processor may be used to process data of each frame generated by the online game (i.e., frame data source) prior to forwarding the processed frame of data to the encoder for encoding. The processing of data may be to determine the complexity of the data contained in the frame so that the encoder may be able to make informed decisions on which portion(s) of the processed data to retain and which ones to discard.

In one implementation, a method is disclosed. The method includes receiving a frame of data generated for an online game, from a server device. The frame of data represents a current state of the online game. The frame of data is encoded using an encoder. The encoded frame of data is transmitted to a client device over a network, for rendering. The data contained in the encoded frame is evaluated to determine an amount of data contained in the encoded frame that is transmitted to the client device. When the amount of data in the encoded frame exceeds a maximum data limit specified for a communication channel established between the server device and the client device, a signal is sent to the encoder to dynamically reduce amount of data included in one or more subsequent frames that are to be forwarded to the client device for rendering. The adjusting is performed to maintain a frame rate defined for the online game.

In another implementation, a system used for processing data of an online game is disclosed. The system includes a server configured to execute an instance of the online game and generate frames of data for transmitting to a client device. The system also includes an encoder that is configured to receive the frames of data of the online game and encode the frames of data in accordance with a maximum data limit specified for a communication channel that is established between the server and the client device. A monitoring system is included in the server and is configured to monitor amount of data included in each of the frames and to generate a signal to the encoder to dynamically reduce the amount of data included in one or more subsequent frames, when the amount of data included in a particular frame preceding the one or more subsequent frames, exceeds the maximum data limit.

In another alternate implementation, a method is disclosed. The method includes receiving a frame of data generated for an online game from a server device. The frame of data represents a current state of the online game. The method further includes, verifying if a previously encoded frame of data exceeded a maximum data limit specified for a communication channel established between the server device and a client device. When it is determined that the previously encoded frame exceeded the maximum data limit, dynamically reducing the amount of data contained in the frame to a reduced maximum data limit prior to encoding the frame of data to generate the encoded frame. The encoded frame of data is forwarded to the client device over the communication channel.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 2A illustrates a simplified block diagram of different components of a server device used to provide a steady frame rate of the online game content generated during game play of the online game, to the client device, in accordance with one implementation of the present disclosure.

FIG. 2B illustrates a simplified block diagram of different components of a server device used to provide a steady frame rate of the online game content generated during game play of the online game, to the client device, in accordance with an alternate implementation of the present disclosure.

FIG. 5 illustrates a simple example of using maximum bitrate to adjust content in different frames generated by a frame source (e.g., online game application, or online interactive application) to provide continuous frames to a client, in one implementation.

DETAILED DESCRIPTION

Figure 1:
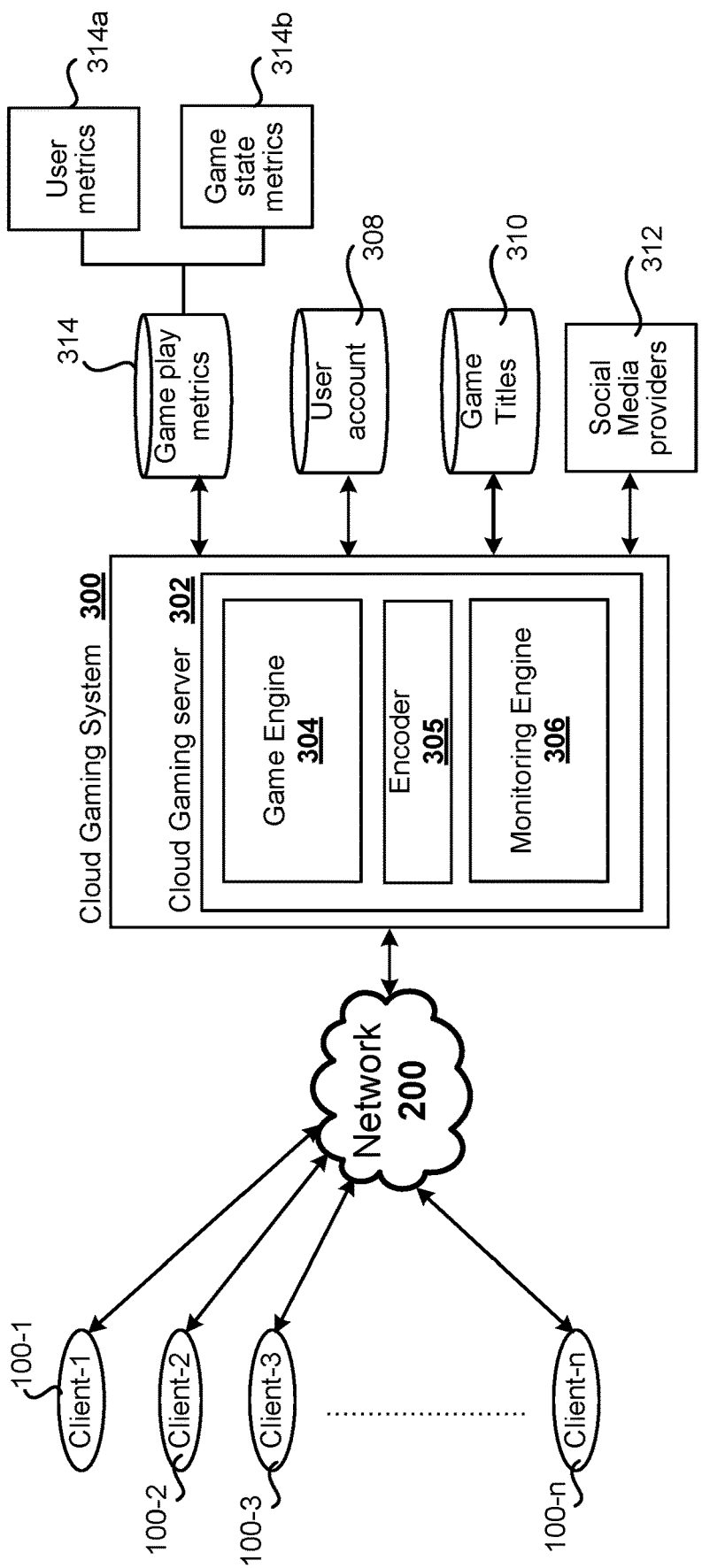
FIG. 1 illustrates a simplified physical view of a cloud gaming system that is used in maintaining smooth frame rate for a streaming interactive application, such as an online streaming game, in accordance with one implementation of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various implementations of the present disclosure describe systems and methods for evaluating an amount of data contained in each frame of data generated by an online streaming application (e.g., an online game application), and when the amount of data contained in a frame exceeds a maximum data limit specified for the online game, dynamically reducing the amount of data in one or more subsequent frames. The maximum data limit may be based on a maximum bitrate that can be handled by a communication connection established between a server device generating the frames of data and a client device that requests the data by selecting the streaming application. The amount of data contained in each subsequent frame may be dynamically reduced by compressing the data using a compression algorithm or by selectively discarding portions of data that are not critical for rendering image(s) included in the frame, or by other means that are generally available or through specialized algorithm.

Conventional way of processing the frames of data included detecting a large frame of data that exceeded a maximum data limit specified, and in response, dropping one or more subsequent frames of data so that the maximum bitrate of the communication connection can be followed. This results in inconsistent frame rate and, when the dropping of frames becomes too frequent, results in choppy video.

The various implementations discussed herein, on the other hand, includes a system that is configured to detect the large frame, and instead of dropping the one or more subsequent frames, the system is configured to instruct an encoder to adjust the bitrate down for subsequent one or more frames so as to be able to recoup the sent debt caused by sending excess data. The system may detect the excessive bitrate that was transmitted in a frame, and treat the excessive data as an "overdrawn bitrate" account. The system may recoup the excess data transmitted in the frame by reducing data from the subsequent frames following the frame that was "overdrawn". A monitoring engine within the system is configured to keep track of the amount of excess data transmitted in a frame that resulted in the bitrate overdraw, determine a number of subsequent frames from which to recoup the excess data, and provide instructions to an encoder to dynamically reduce the amount of data in the determined number of subsequent frames. The number of subsequent frames for which the data needs to be dynamically reduced may be determined based on amount of excess data included in the frame, and/or the demand of the online game, or the type of online game, etc.

A "sent debt" counter is used to keep track of the amount of excess data included in the frame and the number of subsequent frames that is to be used to recoup. After each frame has been forwarded to the client device, the sent debt counter is updated. For each frame received at the encoder, the monitoring engine is used to query the sent debt counter to determine if the sent debt counter is zero or non-zero. If the sent debt counter is non-zero, then the monitoring engine instructs the encoder to adjust the amount of data in the frame currently received at the encoder for encoding, and then transmit the adjusted encoded frame to the client device. If, on the other hand, the sent debt counter is zero, then the monitoring engine instructs the encoder to resume encoding the current frame using normal bitrate (i.e., maximum data limit) defined for the online game.

The content generated by an online game is video content. The amount of data contained in each frame defines a bitrate, which is measured in megabits per second (Mbps). The bitrate depends partially on resolution of the video content. To provide a realistic game experience, the game logic may be configured to provide high resolution video frames. A high resolution video frame includes higher amount of data (i.e., higher bitrate) as opposed to a low resolution video frame that includes less amount of data. Usually a heavily compressed video data has less data (i.e., lower bitrate) than a lightly compressed or uncompressed video data. Consequently, a compressed video data has lower video quality (i.e., lower video resolution). Generally speaking, for a good quality video content, a bitrate of 40 Mbps is recommended and this bitrate is for uncompressed or very lightly compressed video. The bitrates are defined in accordance to the bandwidth requirements of a communication channel used for transmitting the video content.

The video data is usually transmitted at a frame rate defined for the online game. Frame rate describes the speed at which the video data plays at a receiving device and this may depend on the type of online game being played. When more frames per second are played, the video that is rendered appears smoother. Increasing the frame rate would cause an increase in bitrate as more data needs to be provided in the frames. Thus, the frame rate may be defined for the online game based on the level of smoothness expected/defined for the online game. As the frame rate also affects the bitrate, the frame rate may be defined in accordance to the available bandwidth for the communication channel used in transmitting the video content to the client device. Usually, frame rates are standardized across an industry that generates the content and may be defined to be about 30 frames per second, or 60 fps, or 120 fps.

The monitoring engine ensures providing a smooth and consistent frame rate of content of the interactive streaming application to the client device and avoids frame drops by dynamically adjusting the bitrate of data included in each frame. For an online game selected for play, the video content included in an initial frame generated for the online game may be of a higher bitrate as the content may include an entire scene of the game and this bitrate can be higher than the maximum bitrate allowed for the online game. The monitoring engine detects a bitrate overrun caused by the large initial frame and promptly instructs the encoder to reduce the bitrate in one or more subsequent frames following the large initial frame, so as to allow the system to recoup the data debt caused by the bitrate overrun of the initial frame. The monitoring engine continues to monitor the bitrate of each frame generated for the online game, queries a sent debt counter to determine if a subsequent frame received at the encoder needs to be adjusted, and sends a signal to the encoder instructing the encoder to either dynamically adjust the bitrate of the subsequent frame during encoding or just encode the subsequent frame without any bitrate adjustment. The encoded subsequent frame is forwarded to the client device for rendering. The downward adjustment to the bitrate in the subsequent frame may sometimes adversely affect the resolution quality of the subsequent frame, which is a small price to pay for maintaining the frame rate as opposed to intermittent dropping of frames observed from using conventional encoders. Intermittent dropping of frames may affect the overall quality of the video content provided to the user, especially when the number of frames that are dropped extends for a longer period or are more frequent, as the video becomes very spotty.

A user may set up their user account at a cloud system, such as cloud gaming system, to enable the user to access the various online games available therein. One or more cloud gaming servers of the cloud gaming system may execute an instance of an online game locally on the cloud and generate streaming content for transmitting to a client device of the user for rendering. As the user plays the online game and provides game inputs, the game inputs are transmitted to the cloud gaming server(s) to affect an outcome of the online game. Responsive to the game inputs, the cloud gaming server(s) generates frames of data for transmission to the client device for rendering. The generated frames of data are encoded using an encoder available within the cloud system, to generate encoded frame data. The encoded frame of data is forwarded to a network interface, where the frame data is packetized according to transmission protocols defined for a communication channel established between the cloud gaming server(s) and a client device over a network, such as the Internet, and transmitted to the client device.

The encoder provides the encoded frame data to a monitoring engine available in the cloud system. The monitoring engine may be integrated within the encoder or be available within the cloud gaming server, and be communicatively connected to the encoder to allow interaction with the encoder. The monitoring engine examines the amount of data included in the encoded frame. The monitoring engine verifies if the amount of data contained in the encoded frame exceeds a predefined maximum data limit defined for each frame of the online game. If the encoded frame exceeds the predefined maximum data limit, the monitoring engine determines the extent to which the amount of data included in the encoded frame exceeds the maximum data limit and sends a signal to the encoder to dynamically reduce the bitrate of one or more subsequent frames of data received after the large frame that exceeded the maximum data limit. Responsive to the communication from the monitoring engine, when the encoder receives a subsequent frame from the cloud gaming engine, the encoder injects a new and reduced bitrate during the encoding of the subsequent frame. The reduced bitrate may be predefined for the online game. The encoded subsequent frame with the reduced bitrate is forwarded to the client device for rendering. The monitoring engine continues to verify each and every encoded frame of data received from the encoder to determine the amount of data included within and instructs the encoder to dynamically adjust subsequent frame(s) so as to maintain the frame rate while following the bitrate limit of the communication channel.

The monitoring engine may query a "sent debt" counter maintained for the online game. The sent debt counter maintains a running tally of data overrun and a number of subsequent frames for which data needs to be dynamically reduced. Typically, an initial frame from the online game may contain a large amount of data as the initial frame includes the images of an initial game scene of the online game and the subsequent frames may include updates to the images contained in the initial frame. However, from time to time, depending on the user input and depending on the type of game and current game state of the game, a subsequent frame may include large amount of data. This may be the case when the user moves to a different scene and data for the new scene is being provided by the online game. By querying the sent debt counter and closely monitoring the bitrate of each frame received at the encoder, the monitoring engine is able to determine which ones of the frames include excess amount of data and how many subsequent frames need to have data dynamically reduced, and instruct the encoder accordingly. The encoder adjusts the frame(s) of data in accordance to the instructions provided by the monitoring engine. After adjusting the frame(s) of data, the sent debt counter is updated by the monitoring engine. The updated sent debt counter is used to instruct the encoder.

When the sent debt counter is non-zero, the monitoring engine sends a signal to the encoder to adjust the data in a subsequent frame. The encoder, in response to the signal, evaluates the amount of data contained in the subsequent frame received at the encoder. If the amount of data contained in the subsequent frame is less than a reduced maximum data limit defined for the online game, the encoder just encodes the data without performing any adjustment to the data contained in the subsequent frame. For example, if the reduced maximum data limit for the subsequent frame is defined to be about 10,000 bits per frame, and the subsequent frame only contains about 8,000 bits, there is no need to further adjust the content of the subsequent frame down as it is already below the reduced maximum data limit. In this example, the encoder will simply encode the data contained in the subsequent frame and transmit it to the client device. The encoded subsequent frame will be used to recoup some of the data overrun from the previous large frame. After transmission of the subsequent frame, the monitoring engine updates the sent debt counter.

When the amount of data contained in the subsequent frame is above the reduced maximum data limit but does not exceed the predefined maximum data limit and the "sent debt" counter is non-zero, the encoder dynamically injects the new reduced bitrate into the subsequent frame (i.e., reduced maximum data limit) and forwards the encoded subsequent frame to the client device. Injecting the new reduced bitrate may include compressing the data in the subsequent frame using a compression technique. The monitoring engine with the aid of the sent debt counter manages the frame rate of the online game to be consistent and smooth so that the content of the online game can be viewed without latency or noticeable hitch.

With the general understanding of the inventive embodiments, example details of the various implementations will now be described with reference to the various drawings.

FIG. 1 provides an overview of a cloud gaming system 300 used for providing a steady stream of frames of data related to game play of the online game to a client device, in accordance with one implementation. A plurality of client devices 100 (100-1, 100-2, 100-3, . . . 100-n) are used by different players (i.e., users who play an online game) to access the cloud gaming system (CGS) 300, social media applications, and other interactive applications over a network 200, such as the Internet. The client devices 100 may be accessing the CGS 300 from different geo locations. The client devices 100 can be any type of client computing device having a processor, memory, with access to a network (e.g., Local Area Network (LAN), Wide Area Network (WAN), Wireless LAN, MAN (Metropolitan Area Network), Personal/Private Area Network (PAN), Virtual Private Network (VPN), etc.) using wired, wireless, 4G, 5G or other communication capabilities, and being portable or not portable. For example, the client devices can be smartphones, mobile devices, tablet computers, desktop computers, personal computers, wearable devices, or hybrids or other digital devices that include monitors or touch screens with a portable form factor.

The client devices having 5G communication capabilities may include mobile devices or any other computing devices that are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

The client devices may run an operating system and include network interfaces that provide access to various game applications or interactive applications (apps) available on the cloud gaming servers in the CGS 300 over the network 200 or could be thin clients with network interface to communicate with the cloud gaming servers 302, which provide the computation functions. Players may access the CGS 300 using a user account and select an online game available at the CGS 300 for game play, wherein the game play is controlled by the players using control/input options provided in the client devices or using controllers that are communicatively connected to the client devices. The user account of a player may be verified against user data stored in user account data store 308 to ensure the player is eligible to access and play a game title of the online game stored in the game titles data store 310, prior to providing access to the online game.

In some implementations, the various applications (e.g., online games) may be executed remotely on one or more cloud gaming servers 302 of the cloud gaming system 300 and game play related data from the executing application are generated as frames, which are streamed to the client device 100 over the network 200. In other implementations, the online games may be executed locally at the client devices and metadata from the executing online game may be transmitted over the network 200 to the cloud gaming server(s) 302 for affecting the game state. The frames of game play data are forwarded to an encoder for encoding and the encoded frames are forward to the client device for rendering.

It should be noted that the players and users both refer to people/persons who have a user account and are eligible to access and interact with the applications (including online games) that are available on the cloud gaming system 300. The player or a user is a person who has previously played or has currently selected an online game for playing. A "user" may also be a person who has selected the online game for viewing game play of a player (e.g., a spectator) before selecting the online game for game play.

The cloud gaming system (CGS) 300 may include a network of back-end servers that are distributed across different geo locations and are configured to execute instances of one or more online game applications and/or other interactive applications that are available at the back-end server. The back-end server 302 may be a cloud gaming server or cloud application server that is configured to execute instances of the one or more online games/interactive applications. For purpose of simplicity, reference will be made to a cloud gaming server (or simply a "game server") executing an instance of an online game application, although the implementations disclosed herein can be extended to any other interactive applications that may be used to provide frames of interactive data to a user. The game server may be any type of server computing device available in the cloud gaming system, including, but not limited to, a stand-alone server, a server that is part of a server farm or data center, etc. Further, the game server may manage one or more virtual machines supporting a game processor that executes an instance of an online game on a host.

The online game executed by the cloud gaming server 302 may be a single player game or a multi-player game. In some implementations, the online game may be a massive multi-player online (MMO) game that allows a plurality of players and spectators from across different geo locations to access and play/view the online game. The cloud gaming server 302 may include a multi-player distributed game engine that is communicatively connected to game logic of the online game. Generally speaking, a game engine is a software layer that serves as a foundation for a game, such as MNIO game, and provides a framework that is used to develop the online game. The game engine abstracts the details of doing common related tasks (i.e., game engine tasks) required for every game, while the online game developers provide the game logic that provides the details of how the online game is to be played. The game engine framework includes a plurality of reusable components for processing several functional portions (i.e., core features) for the online game that bring the online game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the online game.

During game play of an online game, the game engine manages the game logic of the online game, collects and transmits players inputs received from different client devices to the game logic, manages the allocation and synchronization of the functional portions of the game engine to process game data generated by the game logic, in an optimal manner, and generates frames of game data that is transmitted back to the client devices for rendering. A variety of game engines are currently available to provide different core functionalities and an appropriate game engine may be selected based on the functionalities specified for executing the online game.

The game logic analyzes the inputs provided by the players at the respective client devices during game play sessions, updates game state of the online game based on the inputs, manages saved data of each of the players playing the online game, and generates game data that is processed by the distributed game engine prior to being streamed to the client device of the user during the game play session. The game state of the online game is used to identify game state metrics of the online game and user metrics of the players, which may be stored separately within game play metrics 314. For example, the user metrics related to intricacies of game play of each player may be stored in user metric datastore 314*a* and the game state metrics of the online game may be stored in game state metrics datastore 314*b*. The game state identifies overall state of the online game at a particular point and is affected by intricacies of the game play of one or more players. The user metrics of each player includes any game customization provided by the player for the online game. The distributed game engine, using the game state provided by the game logic, is able to overlay/insert objects and characters into the gaming environments of the player participating in the game play session. In some implementations, the game logic of each instance of the game may be executed on a server or on a plurality of servers, based on how the game logic is configured.

The game inputs provided during game play by each of the players of the online game, game state of the online game, the location of each of the players in the online game, and details of the activities performed by each of the players may be stored by the game engine as telemetry data either within the game state metrics 314*b* or separately in a telemetry data store (not shown) by the game engine 304. The details included in the telemetry data identifies characteristics of each activity that a player attempted, accomplished, and player attributes of the player who attempted, accomplished each activity in the online game. The telemetry data associated with each player may be used to recreate a portion of the online game, when the online game needs to be resumed or re-started from a particular point. Additionally, the telemetry data may be used to generate the frames of data for forwarding to the client device.

The frames of data generated by the game engine are forwarded to an encoder 305 for encoding prior to being transmitted to the client device for rendering. The encoder 305 may be a hardware encoder or a software encoder and is configured to encode the data contained within the frames in accordance to a defined encoding algorithm. The encoded frame of data is also forwarded to a monitoring engine 306. The monitoring engine evaluates the amount of data contained within each encoded frame and verifies the amount of data against a predefined maximum data limit specified for the online game, based on a communication connection established between the cloud gaming server 302 and the client devices 100. The maximum data limit is driven by the bandwidth capabilities of the communication connection, which may be set by the network service provider.

When the monitoring engine 306 detects the amount of data sent in a particular frame exceeding the predefined maximum data limit, the monitoring engine 306 sends a signal to the encoder 304 to reduce the amount of data included in a subsequent frame. The monitoring engine 306 may maintain a "sent debt" counter, which acts as an overdraft account and keeps a tally of the amount of excess data sent in the particular frame that needs to be recouped, and the number of subsequent frames from which to re-coup the excess "debt". In some implementations, the excess data may be recouped from one or more subsequent frames. The number of subsequent frames from which to recoup the excess data sent in the particular frame may be determined by the monitoring engine based on the extent to which the amount of data in the particular frame exceeded the maximum data limit (i.e., bitrate) set for the communication connection, a type of data that is being transmitted, a type of online game for which the data is being generated, demands of the online game, the bandwidth capabilities of the communication connection, or combinations of two or more thereof. For instance, if the online game is a high intensity game, the recouping has to be done faster, as opposed to an online game that is being viewed by a plurality of users. The recouping may have to be done faster in high intensity game in order to maintain the bitrate for the communication channel.

The monitoring engine queries the sent debt counter to determine if the data included in a subsequent frame needs to be dynamically adjusted, and sends an appropriate signal to that effect to the encoder. The signal generated by the monitoring engine 306 may include an indicator to indicate if the subsequent frame needs to be dynamically adjusted and, if so, the reduced maximum data limit specified for adjusting the subsequent frame. As with the speed of recouping, the reduced maximum data limit may be set based on the type of game or the demands of the game. In response to the signal provided by the monitoring engine, the encoder first evaluates the amount of data contained in the subsequent frame. If the amount of data contained in the subsequent frame exceeds the reduced maximum data limit, the encoder then dynamically adjusts the data contained within the subsequent frame to be equal or below the reduced maximum data limit. If, on the other hand, the amount of data contained in the subsequent frame does not exceed the reduced maximum data limit, the encoder simply encodes the data in the subsequent frame and transmits the encoded data to the client device over the network. No adjustment is made to the data included in the subsequent frame, in this case, as the amount of data is already less than the reduced maximum limit set for the subsequent frame. For example, if the reduced maximum data limit for the subsequent frame is set at 10,000 bytes, and the data included in the subsequent frame is 9,000 bytes, the encoder does not adjust the data in the subsequent frame. Instead, it just encodes the data and forwards the encoded data to the network interface for packetizing for onward transmission to the client device over the network. The encoding of the subsequent frame may include portion of data from the large frame that exceeded the maximum data limit, so as to recoup the sent debt incurred by the system.

After encoding and transmitting the subsequent frame, the encoder interacts with the monitoring engine 306 to update the sent debt counter to account for the subsequent frame that was sent to the client device. The sent debt counter is updated even when the amount of data does not need to be adjusted in the subsequent frame, as shown in the above example. The querying of the sent debt counter by the monitoring engine and sending of the signal to the encoder continues so long as frames of data are generated for the online game.

The current implementation allows the system to recoup the excess data sent in a particular frame by reducing the data in subsequent frames. Each frame generated by the online game is required to adhere to a maximum data limit for the data that is included in the frame. However, the data contained in each frame generated by the online game does not always adhere to the maximum data limit. The monitoring engine, discussed in the various implementations, handles this by recouping the excess data from the frames following the big frame, dynamically, so that the frames overall follow the specified maximum bitrate. The number of frames for which the bitrate is to be adjusted could be 1 or 10 or more, depending on the extent to which the data in the detected big frame exceeds the maximum bitrate. Reducing the data in the one or more subsequent frames (i.e., reducing the bitrate contained in the subsequent frame(s)) allows the system to recover from the burden of the bitrate overrun caused by the big frame. The over-burdening of data can lead to latency or dropping of frames. The dynamic adjustment of the data in the subsequent frames ensures delivery of all frames to the client device and maintenance of consistent frame rate defined for the online game that meet the maximum data rate. The reduction in the data for the subsequent frames may result in reduction in quality of the subsequent frames delivered to the client device but such reduction in quality is temporary as the system is able to quickly recoup the sent debt and resume sending of frames at the maximum data rate defined for the online game once the sent debt is recouped.

FIG. 2A illustrates an example game cloud system that engages a monitoring system for maintaining the frame rate for an online streaming game, in one implementation. The game engine 304 executes an instance of an online game on a server, such as a cloud gaming server 302, in response to a user selecting the online game for game play. User input provided at the client device 100 of the user is communicated to the game engine to affect the game state of the online game. The online game generates frames of data 135 representing current game state of the game. The frames of data 135 are forwarded to an encoder 305 available to the cloud gaming server 302. The encoder 305 may be available on the cloud gaming server 302 that is executing the instance of the online game, or on a different server within the cloud gaming system 300, or may be a separate computing device that includes the encoder logic. In the implementation illustrated in FIG. 2A, the encoder 305 is shown to be a hardware encoder that can directly connect to the network 200. The implementation is not restricted to the use of a hardware encoder but can be easily extended to the use of a software encoder as well.

The encoder 305 is specified to not exceed a suggested frame size, wherein the suggested frame size can follow the bandwidth of a communication channel established between the server 302 and the client device 100. The encoder may not always follow the suggested frame size and may include data that exceeds the suggested frame size. In order to not overwhelm the communication channel with data overload, the cloud gaming system engages a monitoring engine 306 to keep track of the amount of data included in each encoded frame and to control the bitrate of subsequent frames following the frame that exceeds the frame size.

The encoder 305 encodes the data in accordance to an encoding algorithm and forwards the encoded frame to a network interface defined within one of the servers (e.g., cloud gaming server 302 or another server) of the cloud gaming system. The network interface packetizes the encoded frame of data in accordance to a transmission protocol defined for the communication channel and forwards the packets of data over the network to the client device 100 for rendering. The encoder 305 also provides the encoded frame of data that was forwarded to the client device 100, to the monitoring engine 306. The monitoring engine 306 evaluates the amount of data in the encoded frame. When the encoded frame includes data that exceeds the maximum data limit for the frame, the monitoring engine 306 detects the excess data and instructs the encoder to reduce the amount of data included in one or more subsequent frames. The monitoring engine maintains a sent debt counter and dynamically updates the sent debt counter to indicate the excess data in the encoded frame sent to the client device 100.

When the encoder receives a subsequent frame from the game engine (i.e., frame source), the encoder checks to see if the monitoring engine 306 has sent a signal to adjust the data in the subsequent frame. When the encoder detects a signal from the monitoring engine 306, the encoder identifies a pre-defined reduced maximum data limit, and then verifies the amount of data contained in the subsequent frame to determine if it is within the pre-defined reduced maximum data limit. The signal from the monitoring engine 306 may include instruction to reduce the amount of data contained in the subsequent frame and the reduced maximum data limit that can be used by the encoder to reduce the data within the subsequent frame. Based on the signal, the encoder checks to see if the subsequent frame includes data that is within the reduced maximum data limit. If the amount of data within the subsequent frame is within the reduced maximum data limit, the encoder 305 will encode the subsequent frame without doing any adjustment to the data. If, on the other hand, the data in the subsequent frame exceeds the reduced maximum data limit, the encoder will dynamically adjust the data in the subsequent frame and then encode the frame. The encoded subsequent frame is forwarded to the network interface for packetizing, where the data from the subsequent frame may be combined with some of the data from the previous large frame sent by the encoder to the network interface for packetizing and transmitting to the client device, so as to recoup the excess data of the previous large frame. The encoder then forwards the packets of data that includes data from the encoded subsequent frame and the excess data from the previous large frame to the client device 100 for rendering. The reduced maximum data limit, as the name suggests, is less than the regular maximum data limit specified for the frame. For example, the maximum data limit for a frame may be set at 20,000 bytes, while the reduced maximum data limit may be set at 10,000 bytes. The reduced maximum data limit, for example, may be set based on the type of game or demands of the game.

FIG. 2B illustrates an alternate implementation of the game cloud system that engages a monitoring system to maintain the frame rate for an online streaming game. The components of the game cloud system identified in this implementation are similar to the ones illustrated and described with reference to FIG. 2A except for a frame data processor 309 that is between the frame source and the encoder. As a result, components that are common in FIGS. 2A and 2B are referred to using the same reference numerals and are configured to perform similar functions. In this implementation, the game engine, instead of forwarding the generated frames directly to the encoder, now forwards the frames to the frame data processor 309 for processing. As part of processing, the frame data processor 309 is configured to analyze data contained in each frame to determine the complexity of the data contained within the frame. Information provided by the frame data processor 309 is used to identify data that is critical for rendering an image contained in the frame, for the user, at the client device. The critical areas may be areas where changes are occurring at the game scene or to a game object/avatar as a result of user input to the online game or where an action/event is occurring in response to a user input to the online game. In some implementation, the critical areas that include the changes may be identified to be specific for the user for whom the data is being generated. For example, an I-frame may be generated by the game engine to include data for constructing an entire scene of a game when rendered at the client device, and the game engine may generate subsequent frames as P-frames. The P-frames include the changes to the game scene contained in the I-frame, wherein the changes may include movement of an object or performance of an action or occurrence of an event that are specific to the user and are identified from processing inputs of the user to the online game. However, not all the changes contained in the P-frames may be critical to a user. For instance, an occurrence of an event may have been recorded as a change and included in the P-frames generated by the game engine. But, the event may be occurring behind a user-controlled avatar. As a result, this event may not be important to the user as the user has already moved past that point or location where the event is occurring. The frame data processor 309 may contextually analyze the data contained in each frame generated by the online game to determine which data is critical or important for rendering to the user. It should be noted that the data that is critical to a first user may or may not be critical to a second user. As a result, the content rendered for the first user may not be the same as the content rendered for the second user, even when the first user and the second user are interacting within a same scene.

The frame data processor 309 forwards the results of the analysis to the encoder 305 along with the frame data. The encoder 305 uses the information provided by the frame data processor 309 to determine which data to keep and which data to discard in each frame, when the encoder is instructed to dynamically reduce the amount of data contained within a frame. The encoder 305 dynamically reduces the amount of data in the frame, during encoding, by retaining the data that is identified to be critical to the user and encoding the retained data. The amount of data that needs to be reduced is in accordance to reduced maximum data limit specified by the monitoring engine 306. The resulting encoded frame is forwarded to the client device. It should be noted that the frame for which the amount of data is dynamically reduced is a frame (i.e., subsequent frame) that follows a big frame.

In alternate implementation, the encoder may reduce the amount of data included in non-critical sections and leave the data for the critical sections as-is, when encoding the frame that is to be dynamically reduced. In yet another alternate implementation, the encoder may compress the data contained in the frame using any one of lossy or lossless technique, so that the subsequent frame follows the reduced maximum data limit specified for the online game.

Figure 3B:
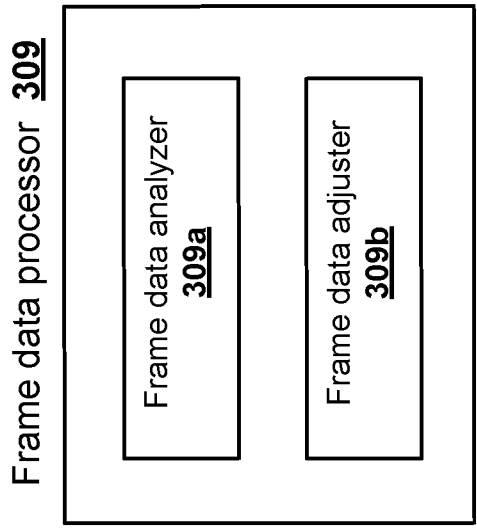
FIG. 3B illustrates a simplified block diagram of different components of a frame data processor used to adjust data provided to the encoder for encoding, in accordance with one implementation of the present disclosure.
Figure 3A:
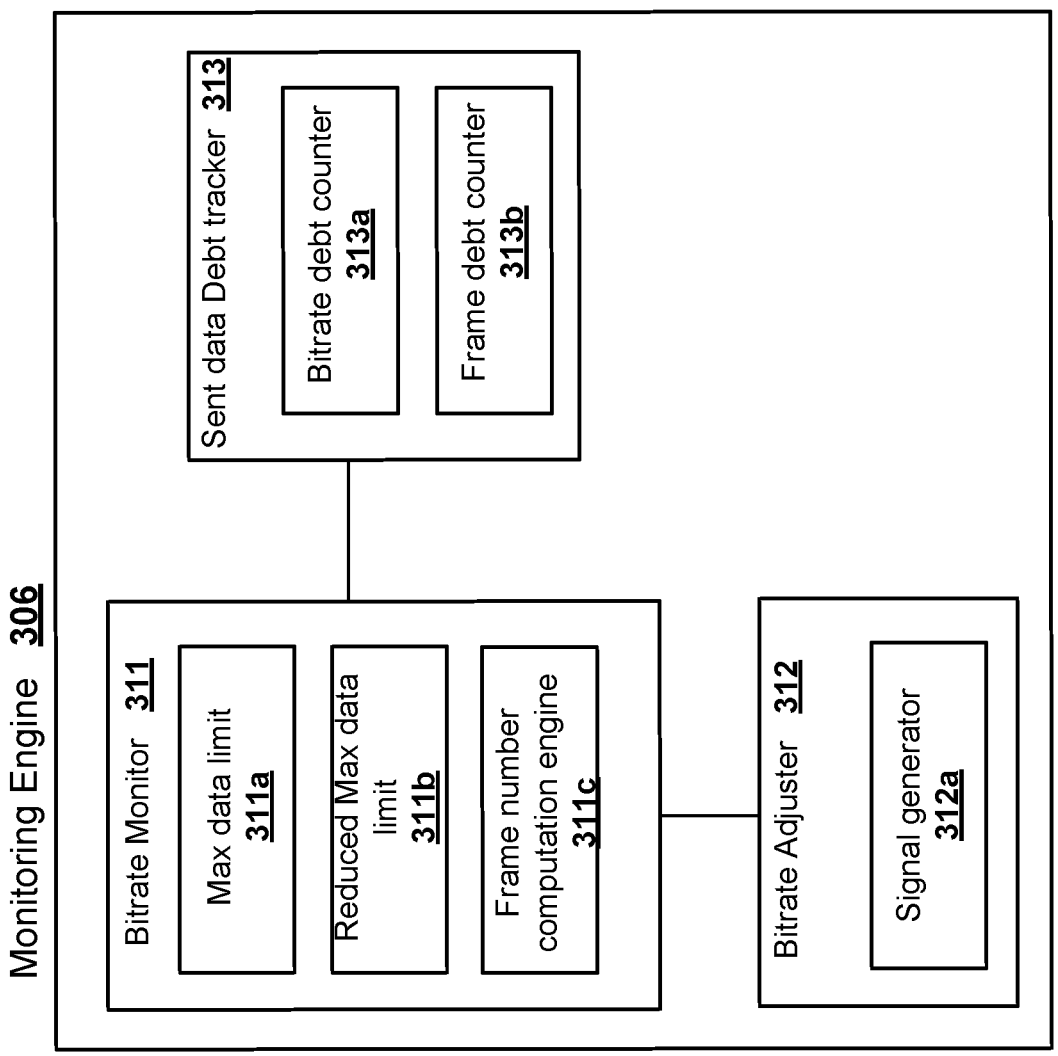
FIG. 3A illustrates a simplified block diagram of various components of a monitoring engine used to identify an amount of data that an encoder needs to include in each frame of data transmitted to the client device, in accordance with one implementation of the present disclosure.

FIG. 3A illustrates various components of a monitoring engine used in maintaining a steady stream of frames for the online game, in one implementation. The monitoring engine 306 may be part of the game engine that executes the game logic or may be a separate engine that receives the frames of data generated by the game engine. The monitoring engine 306 includes a bitrate monitor 311, a bitrate adjuster 312 and a sent data debt tracker (or simply referred to hereon as "debt tracker") 313 to track and adjust the bitrate in each frame. The aforementioned components are provided as examples and should not be considered as exhaustive or limiting. Fewer or additional components may be engaged.

A frame source, such as a gaming engine, generates frames of data during game play of an online game. These frames of data are transmitted to a client device for rendering. User input provided at the client device via controls or interactive user interface of the client device, or from an external controller communicatively coupled to the client device, are transmitted to the gaming engine executing an instance of the online game on a server device. The user input is used to affect a game state of the online game. The updated game state is provided in subsequent frames to the client device for rendering. In the case of streaming online game, the frames are generated in a continuous manner. Depending on the game state of the online game, the amount of data that is included in each frame may vary. An initial frame generated for the online game may be large as it may include data pertaining to a scene of the online game. Subsequent frames generated for the online game may be smaller as they may include only the changes detected in the initial scene. During game play, the gaming engine may from time to time generate big frames of data. This may be the case when the gaming engine detects the user moving from one scene to another or from one level to the next. The generated frames of data are forwarded to an encoder 305 for encoding prior to transmitting the encoded frame to the client device.

The encoder 305 is configured to receive the frame of data and encode the content in accordance to encoding specifics defined for the online game. For example, the encoder may be required to follow a certain frame rate/frequency (e.g., 30 frames per second (fps), 60 fps, 120 fps, etc.) and a maximum bitrate for a communication channel used for transmitting data. The encoded frame is forwarded by the encoder 305 to the bitrate monitor 311.

The bitrate monitor 311 is configured to evaluate the amount of data contained within the encoded frame using a predefined maximum data limit 311a specified for the online game. Each online game may have its own predefined maximum data limit 311a or may follow a common predefined maximum data limit 311a, based on the communication channel that is used to transfer the streaming data to the client device. When the amount of data in the encoded frame exceeds the maximum data limit 311a specified for the online game, the bitrate monitor 311 computes the extent to which the data in the encoded frame exceeds the maximum data limit 311a. The bitrate monitor 311 then determines the reduced maximum data limit 311b that is to be used for adjusting data in the subsequent frame(s), and engages a frame number computation engine 311c to compute a number of subsequent frames for which content needs to be dynamically adjusted in order to recoup the data overrun caused by the encoded frame. The frame number computation engine 311c may compute the number of subsequent frames over which to spread the debt queue in order to recoup the data overrun, on a case by case basis. For example, in the case of a live streaming game, the number of frames over which the debt queue (i.e., recouping overrun) may be spread can be large, such as about 15-about 50 frames, as the latency caused by the debt queue spread may not adversely affect the overall viewing experience of a user. Whereas in the case of an interactive streaming game the spread of the debt queue may have to be more aggressive so that the debt queue can be gotten rid of sooner, in order to maintain a light/minimal latency. Consequently, for the interactive streaming game, the debt queue may be spread across a smaller number of frames, such as between about 1-10 frames or about 1-5 frames or about 1-3 frames. The frame number computation engine 311c thus computes the extent of spread of the debt queue based on the type of data being generated, the demands of the game, the extent of bitrate overrun caused by the encoded frame, etc.

The bitrate overrun and the number of subsequent frames to spread the debt queue are communicated by the bitrate monitor to a sent data debt tracker 313 with instructions to update one or more counters maintained by the debt tracker 313. The debt tracker 313, in response to the instructions from the bitrate monitor 311, may update a bitrate debt counter 313a with the bitrate overrun, and the frame debt counter 313b with the number of subsequent frames.

The bitrate monitor additionally instructs a bitrate adjuster 312 to send a signal to the encoder to adjust the bitrate of a subsequent frame and specifies the reduced max data limit 311b to follow for the subsequent frame. The reduced max data limit may be predefined and may be based on the bandwidth of the communication channel and the types, demands of the online game. In response to the instructions from the bitrate monitor 311, the bitrate adjuster 312 employs a signal generator 312*a* to generate a signal to the encoder 305 to adjust downward the amount of data in a subsequent frame so as to recoup the overrun of data caused by the encoded frame sent to the client device 100. The encoder adjusts the amount of data in the subsequent frame in accordance to the instructions included in the signal. When the subsequent frame is adjusted, encoded and sent over the internet, the bitrate debt counter 313*a* and the frame debt counter 313*b* are updated to account for the amount of debt recouped from the subsequent frame. The evaluating of the encoded frame, the querying of the sent data debt tracker, the instructing of the bitrate adjuster by the bitrate monitor, and the sending of the signal by the bitrate adjuster 132 to adjust a subsequent frame are carried out as soon as the encoded frame has been generated by the encoder and prior to receiving the subsequent frame from the frame source (e.g., online game), and continue till the sent debt is completely recouped. An example of a sequence of operations performed using the bitrate monitor 311 and the bitrate adjuster 312 to instruct the encoder will be described in detail with reference to FIG. 4.

FIG. 3B illustrates the different components of a frame data processor 309 that is used to identify the complexity of the content contained in a frame, in one implementation. The frame data processor 309 is configured to receive frames of data generated at a frame source (e.g., gaming application) and to analyze the data contained in the frame prior to forwarding the frame to the encoder for further analysis and encoding. The frame data processor 309 engages a frame data analyzer 309*a* to analyze the data contained in the frame to understand the complexity of the data. The frame data analyzer 309*a* may perform a contextual analysis of the data to determine how the data relates to each user. The contextual analysis may be used to identify different data as critical for presenting to different users that may be playing or viewing the same game and are within the same scene of an online game (e.g., a multiplayer online game). For instance, a movement of an object behind a user/user's avatar in the online game, may be non-critical while movement of an object or an activity that is in a visual vicinity of the user may be critical. Alternately, an object that the user is interacting with or an activity that is being performed by a user may be more critical to the user than an object that another user is interacting with within the same scene or an activity performed by another user.

A frame data adjuster 309*b* receives the results of the contextual analysis from the frame data analyzer 309*a* and uses the results of the analysis to identify data that relate to the portions of the frame that are critical and data that relate to portions of the frame that are non-critical to the user. The frame data processor 309 forwards the frame of data along with the information resulting from the contextual analysis to the encoder 305. The encoder 305 uses the information provided by the frame data processor 309 when the encoder 305 needs to dynamically adjust the data in the frame, in response to a signal from the bitrate adjuster 312. The encoder 305 encodes the adjusted frame of data and forwards the encoded frame to the client device for rendering. It should be noted that the frame that is dynamically adjusted follows a large frame that caused the data overrun.

The data overrun may be recouped over a number of subsequent frames that follow a large frame. In some implementations, there may be a scenario where a particular subsequent frame within the number of subsequent frames that follows a large frame may itself include data that exceeds the maximum data limit. In this scenario, the bitrate debt counter 313*a* and the frame debt counter 313*b* are updated to account for the excess data included in the particular subsequent frame. Additionally, the frame number computation engine 311*c* may identify additional number of frames that need to be dynamically adjusted to recoup the additional sent data debt incurred as a result of the particular subsequent frame exceeding the limit, which is added to the appropriate debt counters. However, such scenarios may be few and far between as most of the time a large frame of data is followed by a sequence of smaller frames of data from which the excess data is easily recouped before a next larger frame is received.

The dynamic adjusting of the bitrate in the subsequent frames allows recouping of excess data while maintaining the frame rate and minimizing latency during rendering of the frames. This allows the system to provide video content to a user that does not include dropped frames or compromise on the video quality.

Figure 4:
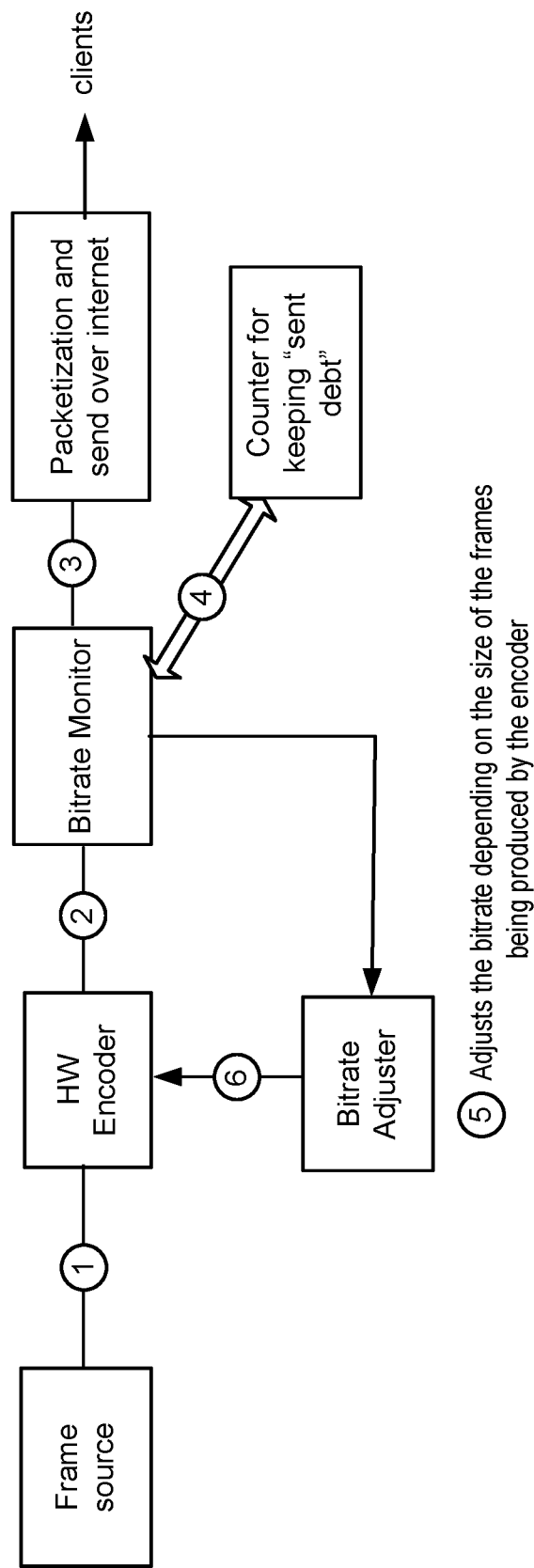
FIG. 4 illustrates a simple process flow diagram used in instructing an encoder regarding amount of data to include in each frame generated by a frame source, in accordance with one implementation of the present disclosure.

FIG. 4 illustrates a sequence of process flow operations performed by engaging the bitrate monitor 311 and the bitrate adjuster 312 components of the monitoring engine 306 to instruct the encoder 305 to adjust bitrate in order to maintain frame rate, in one implementation. An initial frame is generated by a frame source, such as a game engine executing an online game. Although specific implementations are discussed with reference to online game, the implementations can be extended to any other application that generates streaming content. In the case where the online game is being played for the first time, the initial frame may relate to an initial scene of the online game that a user has selected for game play. In the case where the online game is being resumed from a point where the online game was previously paused, the initial frame may be related to the scene from the paused point of the online game. The initial frame may also include user related content, such as user customized avatar, user attributes, etc. The initial frame is forwarded to the encoder for encoding prior to transmission to the client device, as shown by bubble 1.

When the initial frame arrives at the encoder, the encoder checks to see if there is any instruction from the bitrate monitor 311 to dynamically adjust the amount of data contained in the initial frame, and such checking is done by the encoder prior to encoding the initial frame. Since this is a first frame received for the online game (either newly being played or restarted from a paused point), the bitrate debt counter 313*a* and the frame debt counter 313*b* are both zero. Consequently, there is no instruction from the bitrate monitor to adjust the amount of data contained in the initial frame. As a result, the initial frame is encoded in accordance to an encoding algorithm defined in the encoder 305, to generate an encoded frame. The encoded frame is forwarded to the bitrate monitor 306 to enable the bitrate monitor 306 to determine the size of the encoded frame, as shown by bubble 2.

Even when it is the initial frame, the bitrate monitor 311, in response to receiving the encoded frame, queries the sent debt data tracker 313 to determine if there is any data overrun that needs to be recouped, as shown by bubble 4. The data tracker 313 queries the bitrate debt counter 313*a* and frame debt counter 313*b* to determine if there are any remnant data overrun. If one or both of these counters 313*a*, 313*b*, are non-zero, then it means that there is some data overrun that still needs to be recouped. If both of these counters are zero, then it suggests that the data overrun has been fully recouped by the system. For the initial frame arriving at the encoder, the bitrate debt counter 313a and the frame debt counter 313b are both zeros as there are no bitrate overruns recorded for the online game yet. In this case, there are no prior bitrate overrun signals sent by the bitrate monitor 311 to the bitrate adjuster 312.

Next, the bitrate monitor 311 determines the size of the encoded frame by evaluating the amount of data contained in the encoded initial frame against the maximum data limit predefined for the online game. When the bitrate monitor 311 determines that the size of the encoded initial frame is greater than the maximum data limit defined for the communication channel, the bitrate monitor 311 computes the bitrate overrun and updates the bitrate debt counter 313a with the bitrate overrun (i.e., amount of bytes of data that is in excess of the maximum data limit). Further, based on the bitrate overrun, the type of data being generated, the demands of the online game, and the maximum bitrate limit for the communication channel, the bitrate monitor 311 determines number of frames within which to recoup the data overrun of the initial frame. For example, for a streaming interactive video game, the bitrate monitor 311 may use an aggressive number of frames within which to recoup the data overrun while for a streaming game that is being viewed by a plurality of spectators, the bitrate monitor 311 may use a more lenient number of frames to recoup the data overrun. The number of frames from which to recoup the data overrun is updated to frame debt counter 313b, as shown by bubble 4.

Based on the data overrun determination, a signal is sent from the bitrate monitor 311 to the network interface to adjust the packets of encoded data that is being sent to the client, as illustrated by bubble 3. The packet adjusting signal or lack of packet adjusting signal is used by the network interface when packetizing the encoded data in accordance to transmission protocol followed for transmitting the data over the internet to the client device. The packetized data is forwarded to the client device for decoding and rendering. When the signal from bitrate monitor indicates excess data in the encoded initial frame, the network interface, during packetizing, adjusts the encoded data included in the packets so that the data that is communicated in the packets is within the data bandwidth of the communication channel. The remaining excess encoded data is maintained in a cache memory and included with data packets of one or more subsequent frames.

In addition to updating the bitrate debt counter 313a and the frame debt counter 313b, and signaling the network interface to adjust the data packets, the bitrate monitor 311 instructs the bitrate adjuster 312 to send a signal to the encoder 305 to indicate there is a sent debt overrun that needs to be recouped from one or more subsequent frames, as shown by bubble 5. The bitrate adjuster 312 sends a signal to the encoder to dynamically inject a reduced maximum data limit for the data included in a subsequent frame received at the encoder, as shown by bubble 6. The reduced maximum data limit may be predefined and may be based on type of data being generated, and demands of the game.

When a second frame (i.e., a subsequent frame to the initial frame) is received at the encoder 305, the encoder 305 checks to see if any signal from the bitrate adjuster 312 has been received. In response to the signal from the bitrate adjuster 312, the encoder 305 dynamically injects the predefined reduced maximum data limit by dynamically adjusting the data contained in the second frame. The encoder may reduce the amount of data contained in second frame by compressing the data using compression logic. In some implementations, based on the amount of data that needs to be adjusted, different types of compression logic may be implemented. Alternately, selective data that are identified to be critical to the construction of an image may be retained in the second frame and remaining non-critical data may be discarded. Different ways of reducing the data in the second frame may be engaged and are not limited to compression or selective inclusion/discarding. The encoder then encodes the adjusted data, and forwards the encoded second frame of data to the network interface.

The network interface receives the adjusted and encoded data of the second frame along with a signal from the bitrate monitor to include some portion of the excess data from the initial frame. The network interface, in accordance to the signal from the bitrate monitor, includes some of the data left over from the large frame with the data of the second frame, thereby recouping some of the sent debt, and forwards the packets of the encoded and adjusted second frame to the client device for rendering. Since the second frame includes data that is equal to or less than the reduced maximum data limit, there is sufficient space within the frame to include the data left over from the large frame.

After the second frame of data has been forwarded to the network interface, the bitrate monitor 311 updates the bitrate debt counter and the frame debt counter. Since the amount of data contained in the second frame is within the reduced maximum data limit, there is no data overrun caused by the data contained in the second frame. Instead some of the sent debt has been recouped. The bitrate monitor 311 captures the amount of sent debt that was recouped with the second frame by adjusting the bitrate debt counter 313a and the frame debt counter 313b. After adjusting the debt counters (313a, 313b), the bitrate monitor 311 forwards an updated signal to the bitrate adjuster 312 providing current values in the respective debt counters. When the debt counters are non-zero, the bitrate adjuster forwards another signal to the encoder to adjust data of a third frame received at the encoder, in order to recoup the sent debt. The process of receiving the frames of data from a frame source, evaluating the amount of data contained in each frame, dynamically adjusting the amount of data contained in each frame by sending appropriate signals to the encoder, and forwarding the adjusted content to the client device continues for the online game so long as frames of content are generated.

FIG. 5 illustrates a simple example table that represents frame data processing performed using the encoder and monitoring engine, in accordance with one implementation. In this example, at time T1, a frame (e.g., frame 10) is received at the encoder. Frame 10 may be an initial frame (I-frame) generated when an online game is selected for playing or may be a frame generated during play of a current session or from resuming play from a previously paused play session. Time T1 may be a time representing the start/resume of play or may be some time during play of the online game. Frame 10 is shown to include 40,000 bytes of data. The content frame attributes for the online game may be defined to have a frame rate for the data to be 60 frames per second (fps). The maximum bitrate for each frame may be defined in accordance with bandwidth availability of a communication channel established between a server executing the online game and a client device used to interact with the online game. For example, the maximum bitrate may be defined to be 10 megabits per second (Mbps). The specified bitrate defines the amount of data that can be included in each frame. In the above example, each frame is defined to have a maximum data limit of 10,000,000/60/8=20,833 bytes per frame.

Frame 10 is encoded using the encoder and the encoded frame of data is forwarded to the bitrate monitor for evaluation. The bitrate monitor evaluates the amount of data contained in frame 10 and determines that frame 10 includes about 20,000 bytes excess data than what is defined in the frame attributes for the online game. The bitrate monitor also queries the sent debt counters (bitrate debt counter and frame debt counter) to see if any of these sent debt counters is non-zero. The bitrate monitor uses the information from the sent debt counters to determine if there are any over-sent debt that needs to be recouped using one or more subsequent frames. If frame 10 is an initial frame generated for current session of play, then the sent debt counters will be zero. If, on the other hand, frame 10 is from the current session of play of the online game and the prior frame 9 did not have any excess data and did not have to be adjusted, the sent debt counters will be zero. Based on the determination from sent debt counter query (i.e., 'Adjust this frame' is a "No"), the bitrate monitor sends a signal to the network interface to packetize the encoded frame 10 data in accordance with the bandwidth limit of the communication channel. Additionally, as the bitrate monitor detects excess data included in the encoded frame 10, the bitrate monitor also increments the bitrate debt counter by 20,000 (data that is in excess of the maximum data permitted) and the frame debt counter by 2. The number of frames to adjust is determined by the amount of excess data included in the encoded frame and the reduced maximum byte limit defined for the content. Portion of the data (i.e., about 20,000 bytes worth of data) for frame 10 is packetized and sent to the client while the remaining portion of the data (i.e., about 20,000 bytes of excess data) is kept in cache for inclusion in subsequent frames. There is no adjustment made to frame 10 data (i.e., no dynamic reduction of data included in frame 10) other than holding some of the excess encoded data in local cache. The bitrate monitor then signals a bitrate adjuster to send a signal to the encoder to adjust at least the next subsequent frame to recoup the sent debt and this signal is sent as soon as frame 10 has been forwarded to the network interface.

At time T2, the encoder receives frame 11. Upon receipt of frame 11, the encoder determines that a signal has been received from the bitrate adjuster to adjust data in frame 11 (i.e., 'Adjust this frame' is a "Yes"). The encoder determines the reduced maximum bytes (i.e., 10,000 bytes) that can be included in the subsequent frame and evaluates frame 11 to determine if frame 11 needs to be adjusted. There may be instances where there is no need to adjust the subsequent frame, even when there is a signal to the encoder to adjust the subsequent frame. This may happen when the amount of data included in the subsequent frame (i.e., frame 11, in this example) is below the reduced maximum data limit. Based on the evaluation, the encoder determines that frame 11 includes only 9,000 bytes which is below the reduced maximum data limit of 10,000 bytes (i.e., no bitrate overrun in frame 11). As a result, the encoder just encodes the data of frame 11 and forwards the encoded frame 11 data to the network interface with instructions to include some portion of the data from frame 10 that is stored in the cache. In this example, frame 11 leaves about 11,000 bytes available to handle frame 10 being over budget, so that the overall frame data does not exceed the maximum data limit of 20,000 bytes.

After forwarding the encoded frame 11 data with instructions to the network interface, the bitrate monitor decrements the bitrate debt counter by 11,000 bytes and the frame debt counter by 1, as 11,000 bytes of frame 10 was sent in the subsequent frame 11. The adjusted and encoded data included in frame 11 is packetized and forwarded to the client device for rendering. The bitrate monitor instructs the bitrate adjuster to send another signal to the encoder with the updated information of the debt counters.

At T3, frame 12 is received at the encoder and it is about 10,000 bytes, which is at the reduced maximum data limit and well below the maximum data limit. Based on the signal from the bitrate adjuster, the encoder evaluates frame 12 to determine if data in frame 12 needs to be adjusted. However, based on the evaluation of frame 12, the encoder determines that there is no bitrate overrun in frame 12. As a result, the encoder determines that the data in frame 12 does not have to be adjusted before encoding. If, on the other hand, frame 12 included data that exceeded the reduced maximum data limit (e.g., if frame 12 included 12,000 or 15,000 bytes), then the encoder would have adjusted the data in frame 12 by either compression or elimination/discarding of non-critical data so that the data in frame 12 is below the reduced maximum data limit. The encoder then encodes frame 12 data and forwards it to the network interface with instructions to include any leftover data from frame 10. As a result, frame 12 leaves about 10,000 bytes available to handle frame 10 being over budget, so that the overall frame data does not exceed the maximum data limit of 20,000 bytes. Thus, when frame 12 is packetized, the network interface handles the remaining 9,000 bytes of frame 10 with the data from frame 12 and forwards the packets of encoded frame 12 data with the frame 10 data to the client for rendering. Upon forwarding the encoded frame 12 data to the network interface, the bitrate monitor decrements the bitrate debt counter by 9,000 and the frame debt counter by 1, resulting in both the debt counters equaling zero. Consequently, the bitrate monitor instructs the bitrate adjuster to send a signal to the encoder to resume encoding the subsequent frames at the maximum data limit.

When frame 13 is received at the encoder, the encoder evaluates the amount of data in frame 13, based on the signal from the bitrate adjuster to resume maximum data limit for subsequent frames, and determines that the data is below the maximum data limit. The signal from the bitrate adjuster to the encoder indicates that there is no need to adjust data in frame 13 as both the debt counters indicate zero value. Based on this determination, the encoder encodes frame 13 data and forwards the encoded frame 13 data to the network interface with instructions to just packetize and send frame 13 data to the client device. The client device receives frame 13 data and renders. This process of receiving frames of data at the encoder, evaluating and updating the debt counters, instructing the bitrate adjuster to send appropriate signals to the encoder and sending appropriate signals to the network interface continues so long as frames are generated for the online game.

Figure 6:
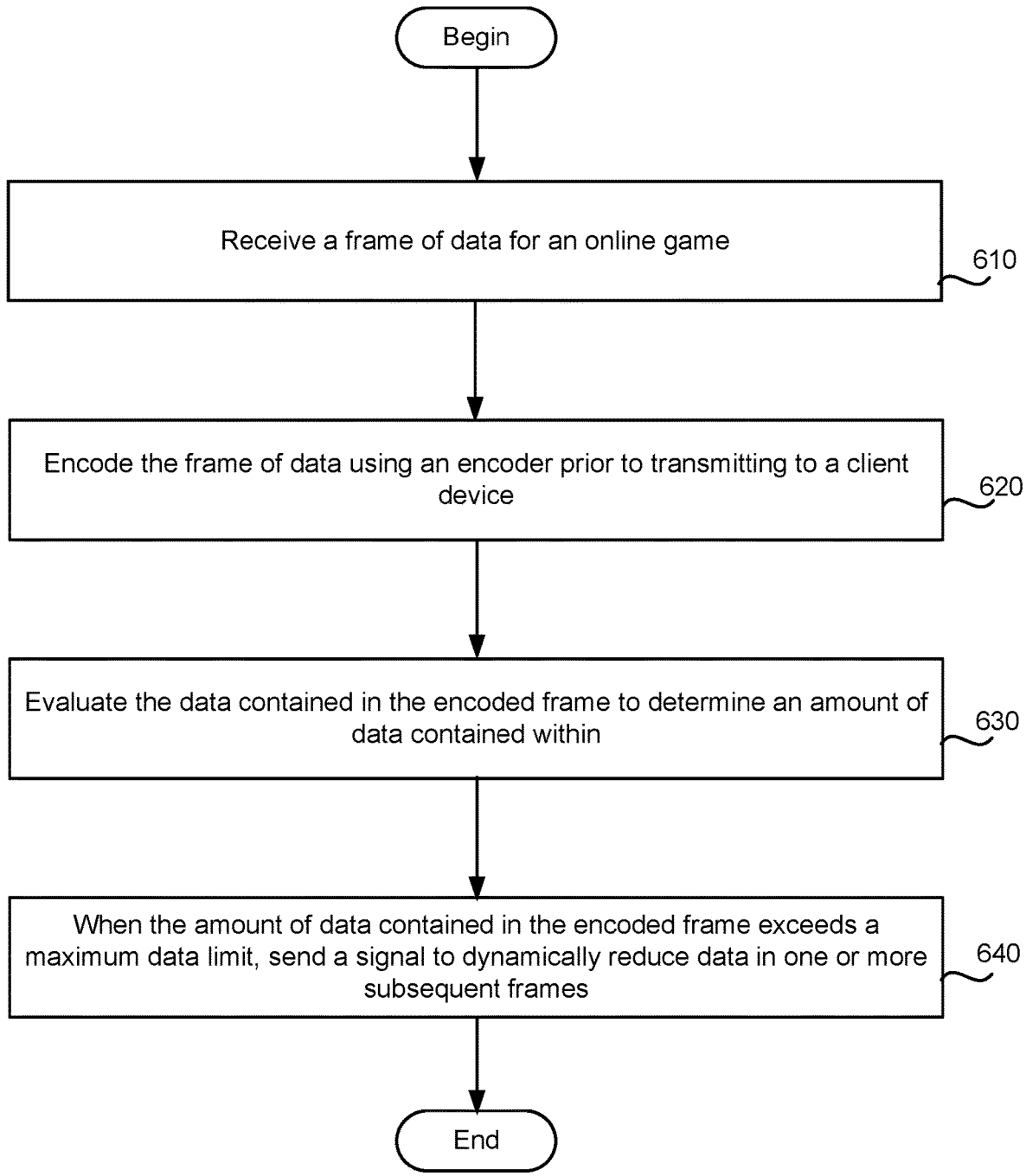
FIG. 6 illustrates a flow of operations of a method of processing frames of data for onward transmission to a client device, in accordance with one implementation.

FIG. 6 illustrates operations of a method used for dynamically adjusting bitrate of one or more subsequent frames for an online game in order to maintain the frame rate defined for the online game, in accordance with one implementation. The method begins at operation 610 when a frame of data is received at the encoder. The frame of data may be generated by an online game engine and may include game state of the online game, in response to user input provided from a client device to the online game executing at a server. The online game may specify a maximum data limit for each frame but the game engine may not always adhere to the maximum data limit specified for the online game, when generating frames of data.

The frame of data is encoded by an encoder prior to transmitting to a client device, as shown in operation 620.

Even when the data contained in the frame exceeds the maximum data limit, the encoder encodes the data within the frame and forwards the encoded frame to a network interface for onward transmission to the client device. The encoded frame of data is also forwarded to a bitrate monitor within a monitoring engine. The bitrate monitor evaluates the amount of data contained in the encoded frame, as illustrated in operation 630. When the bitrate monitor detects data exceeding the maximum data limit, the bitrate monitor instructs a bitrate adjuster within the monitoring engine to send a signal to the encoder to dynamically adjust amount of data contained in one or more subsequent frames, as illustrated in operation 640. The bitrate monitor may compute the amount of data overrun caused by the frame and update one or more counters (e.g., bitrate debt counter, frame debt counter). Upon updating the one or more counters, the bitrate monitor uses the updated information included in the debt counters to instruct the bitrate adjuster. The instruction to the bitrate adjuster may also include a predefined reduced maximum data limit to use when the amount of data in one or more subsequent frames needs to be dynamically adjusted. The reduced maximum data limit may be defined based on the bandwidth of the communication channel established between a server device and a client device. Alternately, the encoder may identify the predefined reduced maximum data limit for the online game. The encoder uses the instructions from the bitrate adjuster to dynamically adjust the amount of data contained in the subsequent frames so that the data overrun from a large frame can be recouped from the subsequent frames.

The adjustment to the subsequent frame may be done using compression logic or through identification and elimination of non-critical data from the frame or through other means that can be used to reduce the data without affecting the quality of the images included in the frames. The various implementations described herein ensure smooth rendering of frames of content of an online game. Some of the frames that may have been dynamically adjusted to recoup the data overrun may have lower resolution due to reduction in data but the low quality frames will last for a very brief period of time before the regular resolution is resumed. Further, the frame rate defined for the online game is maintained, resulting in the rendering of the video of the online game to occur without any hitch. Other advantages may be envisioned by one skilled in the art upon reviewing the various implementations.

The various implementations discussed in this application can be implemented on a cloud system. An overview of an example cloud system supporting the collection of user inputs to update interactive application data and using the updated application data to generate frames of content for transmitting to a client device will be described, in accordance with one implementation of the present disclosure. The example cloud system described herein is a game cloud system (GCS) that enables accessing and playing video games stored therein. The GCS may be a cloud computing system operating over a network to support a plurality of players playing one or more online game applications through corresponding game plays. Data related to those game plays are provided in frames that are encoded by an encoder and transmitted to a client device as data stream over the network. In particular, the system includes GCS that interacts with one or more social media providers and a client device, all of which are connected via a network (e.g., internet). A plurality of client devices associated with a plurality of users may be connected to the network to access services provided by GCS and social media providers. The users may be players or spectators that follow game play of a particular player or of the online game.

In one embodiment, GCS includes one or more game servers, a video recorder, a tag processor, and account manager that includes a user profile manager, a game selection engine (i.e., game selector), a game session manager, user access logic, a network interface, and a social connection manager. GCS may further include a plurality of storage systems, such as a game state store, user accounts, user data store, etc., which may be stored generally in a datastore. Other game storage systems may include a game code store, a recorded game store, a tag data store, video game title store, and a game network user store. In one embodiment, GCS is a system that can provide online game applications, services, gaming related digital content, and interconnectivity among systems, applications, users, and social networks. GCS may communicate with user device and social media providers through social connection manager via network interface. Social connection manager may be configured to relate and/or connect to one or more friends identified using social media providers. In one embodiment, each social media provider includes at least one social graph that shows user social network connections.

A player (i.e., user) is able to access services provided by GCS via the game session manager. For example, account manager enables authentication of a player and access to game titles on the GCS. Account manager stores information about users (players, spectators) and manages the user profile for each user. User information can be used by the account manager for authentication purposes. Additionally, game titles owned by a user may be managed by account manager. For example, video games stored in game title store are made available to a user who owns or is provided access to those video games.

In one embodiment, a user can access the services provided by GCS and social media providers by way of client device through communication connections established over network. Client device can include any type of device having a processor and memory, wired or wireless, portable or not portable. In one embodiment, client device can be in the form of a smartphone, a tablet computer, or hybrids that provide touch screen capability in a portable form factor. One exemplary client device can include a portable phone device that runs an operating system and is provided with access to various applications (apps) that may be obtained over network, and executed on the local portable device (e.g., smartphone, tablet, laptop, desktop, etc.).

Client device may include a display that acts as an interface for user to send input commands and display frames of data and/or information received from GCS and social media providers. Display can be configured as a touch-screen, or a display typically provided by a flat-panel display, a cathode ray tube (CRT), or other device capable of rendering a display. Alternatively, the client device 100 can have its display separate from the device, similar to a desktop computer or a laptop computer.

In one embodiment, client device is configured to communicate with GCS to enable user (player) to play a video game. For example, player may select (e.g., by game title, etc.) a video game that is available in the game title data store via the game selection engine. The selected video game is enabled and an instance of the video game is loaded for execution by a game server on the GCS. In one embodiment, game play is primarily executed in the GCS, and frames of data generated from the game play are encoded using the encoder and transmitted to the client device as a stream of encoded game video frames from GCS. User input commands for driving the game play are transmitted back to the GCS. The encoded video frames received from the streaming game play are decoded at the client device and rendered on the display of the client device.

In one embodiment, after the player chooses an available game title to play, a game session for the chosen game title may be initiated by the player through game session manager. Game session manager first accesses game state store in data store to retrieve the saved game state of the last session played by the player (for the selected game), if any, so that the player can restart game play from a previous game play stop point. Once the resume or start point is identified, the game session manager may inform game execution engine in game server to execute the game code of the chosen game title from game code store. After a game session is initiated, game session manager may pass the game video frames (i.e., streaming video data) to the encoder for encoding, and the encoded video frames are transmitted via network interface to a client device.

During game play, game session manager may communicate with game server, recording engine in the video recorder, and tag processor to generate or save a recording (e.g., video) of the game play or game play session. In one embodiment, the video recording of the game play can include any tag content entered or provided during game play, and other game related metadata. Tag content may also be saved via snapshots. The video recording of game play, along with any game metrics corresponding to that game play, may be saved in recorded game store. Any tag content may be saved in tag data store.

User input commands provided by the user at the client device are communicated to the game server via the game session manager. The user input commands are used to influence the outcome of a corresponding game play of the video game. Input commands (e.g., controller inputs or user inputs), include input commands used to drive game play and user interactive input, such as tag content (e.g., texts, images, video recording clips, etc.). Game input commands as well as any user play metrics (how long the user plays the game, etc.) may be stored in game network user store. Select information related to game play for the video game may be used to enable multiple features that may be available to the user.

Figure 7:
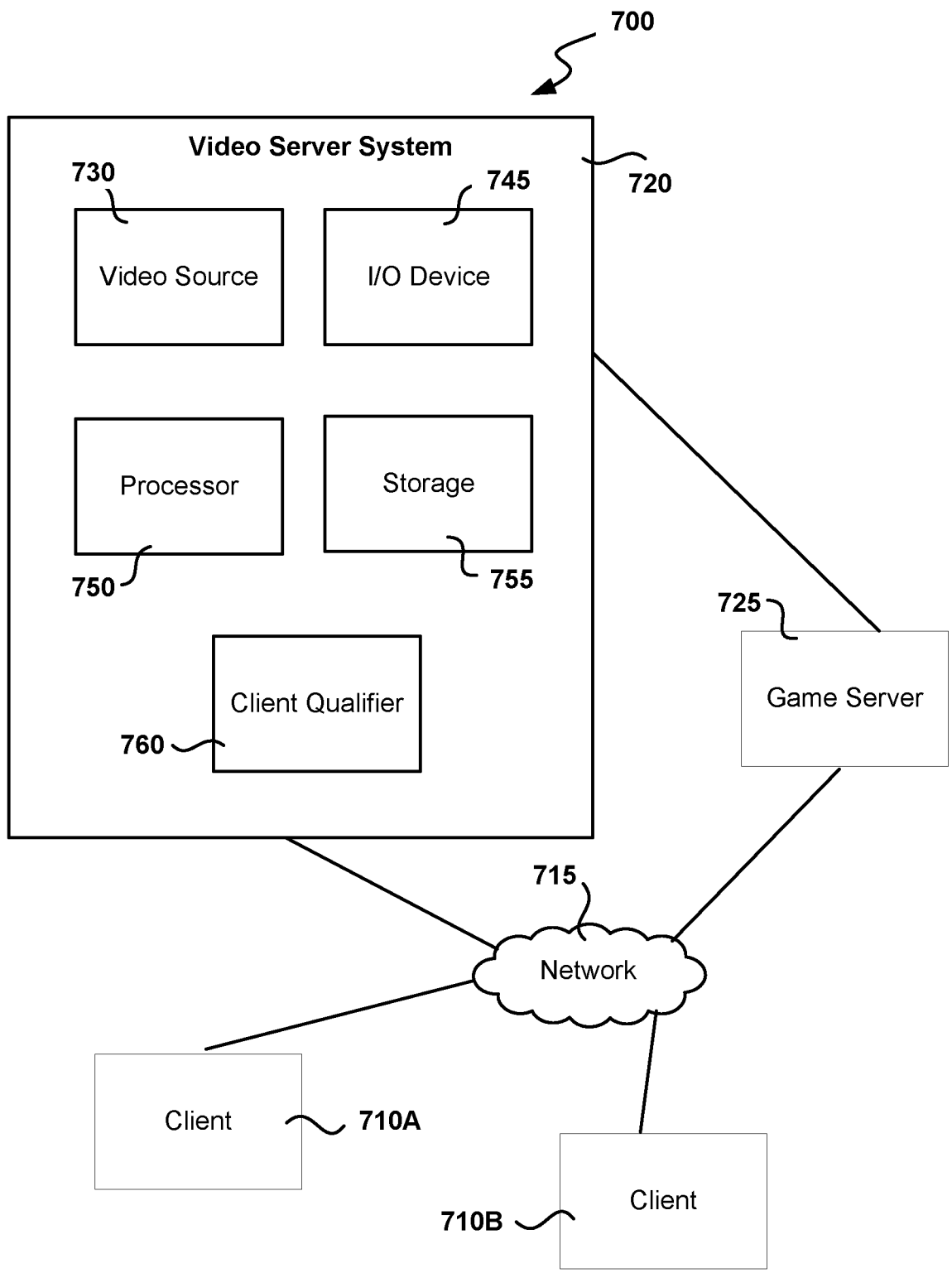
FIG. 7 illustrates a simplified block diagram of an example interactive application system, such as a Game System, in accordance with various implementations of the present invention.

FIG. 7 is a block diagram of a Game System 700, according to various embodiments of the invention. Game System 700 is configured to provide a video stream to one or more Clients 710 via a Network 715. The Network is similar to the Network 200 illustrated in FIGS. 1, 2A and 2B. Game System 700 typically includes a Video Server System 720 and an optional game server 725. Video Server System 720 is configured to provide the video stream to the one or more Clients 710 with a minimal quality of service. For example, Video Server System 720 may receive a game command that changes the state of or a point of view within a video game, and provide Clients 710 with an updated video stream reflecting this change instantly with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 710, referred to herein individually as 710A, 710B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 710 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 710 or on a separate device such as a monitor or television. Clients 710 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 710 are optionally geographically dispersed. The number of clients included in Game System 700 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 720 to deliver a game viewed through the HMD. In one embodiment, the game console receives the video stream from the video server system 720, and the game console forwards the video stream, or updates to the video stream, to the HMD for rendering.

Clients 710 are configured to receive video streams via Network 715. Network 715 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 710 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 710 may, but are not required to, further include systems configured for modifying received video. For example, a client may be configured to perform further rendering, to overlay one video image on another video image, to crop a video image, and/or the like. For example, Clients 710 may be configured to receive various types of video frames, such as I-frames, P-frames and B-frames, and to process these frames into images for display to a user. In some embodiments, a member of Clients 710 is configured to perform further rendering, shading, conversion to 3-D, or like operations on the video stream. A member of Clients 710 is optionally configured to receive more than one audio or video stream. Input devices of Clients 710 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 710 is generated and provided by Video Server System 720. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 710 are typically configured to receive inputs from a user. These inputs may include game commands configured to change the state of the video game or otherwise affect game play. The game commands can be received using input devices and/or may be automatically generated by computing instructions executing on Clients 710. The received game commands are communicated from Clients 710 via Network 715 to Video Server System 720 and/or Game Server 725. For example, in some embodiments, the game commands are communicated to Game Server 725 via Video Server System 720. In some embodiments, separate copies of the game commands are communicated from Clients 710 to Game Server 725 and Video Server System 720. The communication of game commands is optionally dependent on the identity of the command. Game commands are optionally communicated from Client 710A through a different route or communication channel that that used to provide audio or video streams to Client 710A.

Game Server 725 is optionally operated by a different entity than Video Server System 720. For example, Game Server 725 may be operated by the publisher of a multiplayer game. In this example, Video Server System 720 is optionally viewed as a client by Game Server 725 and optionally configured to appear from the point of view of Game Server 725 to be a prior art client executing a prior art game engine. Communication between Video Server System 720 and Game Server 725 optionally occurs via Network 715. As such, Game Server 725 can be a prior art multiplayer game server that sends game state information to multiple clients, one of which is game server system 720. Video Server System 720 may be configured to communicate with multiple instances of Game Server 725 at the same time. For example, Video Server System 720 can be configured to provide a plurality of different video games to different users. Each of these different video games may be supported by a different Game Server 725 and/or published by different entities. In some embodiments, several geographically distributed instances of Video Server System 720 are configured to provide game video to a plurality of different users. Each of these instances of Video Server System 720 may be in communication with the same instance of Game Server 725. Communication between Video Server System 720 and one or more Game Server 725 optionally occurs via a dedicated communication channel. For example, Video Server System 720 may be connected to Game Server 725 via a high bandwidth channel that is dedicated to communication between these two systems.

Video Server System 720 comprises at least a Video Source 730, an I/O Device 745, a Processor 750, and non-transitory Storage 755. Video Server System 720 may include one computing device or be distributed among a plurality of computing devices. These computing devices are optionally connected via a communications system such as a local area network.

Video Source 730 is configured to provide a video stream, e.g., streaming video or a series of video frames that form a moving picture. In some embodiments, Video Source 730 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 725. Game Server 725 may maintain a copy of the state of the game based on game commands received from multiple players using geographically disperse clients. In these cases, the game state is provided by Game Server 725 to Video Source 730, wherein a copy of the game state is stored and rendering is performed. Game Server 725 may receive game commands directly from Clients 710 via Network 715, and/or may receive game commands via Video Server System 720.

Video Source 730 typically includes rendering logic, e.g., hardware, firmware, and/or software stored on a computer readable medium such as Storage 755. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 710. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 730 includes a video recording device such as a camera. This camera may be used to generate delayed or live video that can be included in the video stream of a computer game. The resulting video stream optionally includes both rendered images and images recorded using a still or video camera. Video Source 730 may also include storage devices configured to store previously recorded video to be included in a video stream. Video Source 730 may also include motion or positioning sensing devices configured to detect motion or position of an object, e.g., person, and logic configured to determine a game state or produce video-based on the detected motion and/or position.

Video Source 730 is optionally configured to provide overlays configured to be placed on other video. For example, these overlays may include a command interface, log in instructions, messages to a game player, images of other game players, video feeds of other game players (e.g., webcam video). In embodiments of Client 710A including a touch screen interface or a gaze detection interface, the overlay may include a virtual keyboard, joystick, touch pad, and/or the like. In one example of an overlay a player's voice is overlaid on an audio stream. Video Source 730 optionally further includes one or more audio sources.

In embodiments wherein Video Server System 720 is configured to maintain the game state based on input from more than one player, each player may have a different point of view comprising a position and direction of view. Video Source 830 is optionally configured to provide a separate video stream for each player based on their point of view. Further, Video Source 730 may be configured to provide a different frame size, frame data size, and/or encoding to each of Client 710. Video Source 730 is optionally configured to provide 3-D video.

I/O Device 745 is configured for Video Server System 720 to send and/or receive information such as video, commands, requests for information, a game state, gaze information, device motion, device location, user motion, client identities, player identities, game commands, security information, audio, and/or the like. I/O Device 745 typically includes communication hardware such as a network card or modem. I/O Device 745 is configured to communicate with Game Server 725, Network 715, and/or Clients 710.

Processor 750 is configured to execute logic, e.g. software, included within the various components of Video Server System 720 discussed herein. For example, Processor 750 may be programmed with software instructions in order to perform the functions of Video Source 730, Game Server 725, and/or a Client Qualifier 760. Video Server System 720 optionally includes more than one instance of Processor 750. Processor 750 may also be programmed with software instructions in order to execute commands received by Video Server System 720, or to coordinate the operation of the various elements of Game System 700 discussed herein. Processor 750 may include one or more hardware device. Processor 750 is an electronic processor.

Storage 755 includes non-transitory analog and/or digital storage devices. For example, Storage 755 may include an analog storage device configured to store video frames. Storage 755 may include a computer readable digital storage, e.g. a hard drive, an optical drive, or solid state storage. Storage 715 is configured (e.g. by way of an appropriate data structure or file system) to store video frames, artificial frames, a video stream including both video frames and artificial frames, audio frame, an audio stream, and/or the like. Storage 755 is optionally distributed among a plurality of devices. In some embodiments, Storage 755 is configured to store the software components of Video Source 730 discussed elsewhere herein. These components may be stored in a format ready to be provisioned when needed.

Video Server System 720 optionally further comprises Client Qualifier 760. Client Qualifier 760 is configured for remotely determining the capabilities of a client, such as Clients 710A or 710B. These capabilities can include both the capabilities of Client 710A itself as well as the capabilities of one or more communication channels between Client 710A and Video Server System 720. For example, Client Qualifier 760 may be configured to test a communication channel through Network 715.

Client Qualifier 760 can determine (e.g., discover) the capabilities of Client 710A manually or automatically. Manual determination includes communicating with a user of Client 710A and asking the user to provide capabilities. For example, in some embodiments, Client Qualifier 760 is configured to display images, text, and/or the like within a browser of Client 710A. In one embodiment, Client 710A is an HMD that includes a browser. In another embodiment, client 710A is a game console having a browser, which may be displayed on the HMD. The displayed objects request that the user enter information such as operating system, processor, video decoder type, type of network connection, display resolution, etc. of Client 710A. The information entered by the user is communicated back to Client Qualifier 760.

Automatic determination may occur, for example, by execution of an agent on Client 710A and/or by sending test video to Client 710A. The agent may comprise computing instructions, such as java script, embedded in a web page or installed as an add-on. The agent is optionally provided by Client Qualifier 760. In various embodiments, the agent can find out processing power of Client 710A, decoding and display capabilities of Client 710A, lag time reliability and bandwidth of communication channels between Client 710A and Video Server System 720, a display type of Client 710A, firewalls present on Client 710A, hardware of Client 710A, software executing on Client 710A, registry entries within Client 710A, and/or the like.

Client Qualifier 760 includes hardware, firmware, and/or software stored on a computer readable medium. Client Qualifier 760 is optionally disposed on a computing device separate from one or more other elements of Video Server System 720. For example, in some embodiments, Client Qualifier 760 is configured to determine the characteristics of communication channels between Clients 710 and more than one instance of Video Server System 720. In these embodiments the information discovered by Client Qualifier can be used to determine which instance of Video Server System 720 is best suited for delivery of streaming video to one of Clients 710.

Figure 8:
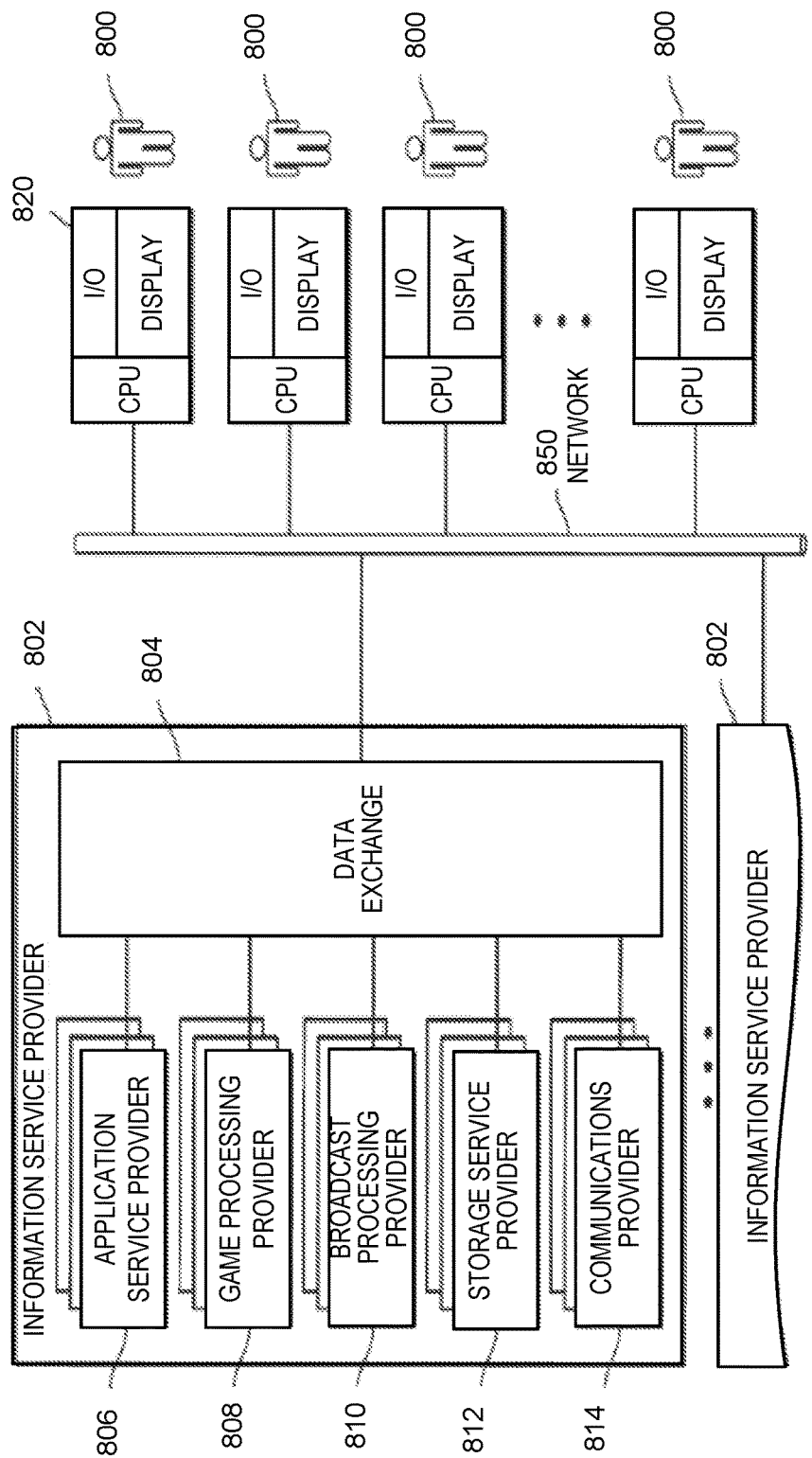
FIG. 8 illustrates an exemplary Information Service Provider architecture for delivering informational content and services to users who are geographically dispersed and connected via network, in accordance with one implementation of the present invention.

FIG. 8 illustrates an implementation of an Information Service Provider architecture that may be used in providing access to different games. Information Service Providers (ISP) 802 deliver a multitude of information services to users 800 geographically dispersed and connected via network 850. Network 850 may be similar to network 200 of FIGS. 1, 2A and 2B. Although the various implementations have been discussed with reference to providing fast access to games, the implementations can be extended to provide faster access to other interactive applications, such as virtual tours, etc., that provide content that can include various levels of content that can be accessed using one or more visual cues or other tools or application points or awards or rewards obtained by the user during interaction with the interactive applications. For example, an ISP 802 can deliver just one type of service, such as a game, or a variety of services such as games, stock price updates, broadcast media, news, sports, gaming, etc. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through a connection module, such that the user information "follows" the user to the new city making the data closer to the user and easier to access. In another implementation, a master-server relationship may be established between a master ISP, which manages the information for the user, and a server ISP that interfaces directly with the user under control from the master ISP. In another implementation, the data is transferred from one ISP to another ISP (i.e., during switching of data center assigned to the user) as the client moves around the world and such transfer may be based on a compatibility of services provided by the respective ISPs to make the ISP 902 in better position to service the user be the one that delivers these services.

ISP 802 includes Application Service Provider (ASP) 806, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 802 includes a Game Processing Server or Provider (GaPS) 808 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another implementation, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server or Provider (BPS) 810 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 812 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 814 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 804 interconnects the several modules inside ISP 902 and connects these modules to client devices 820 of users 800 via network 850. Data Exchange 804 can cover a small area where all the modules of ISP 802 are in close proximity, or can cover a large geographic area when the different modules are geographically dispersed. For example, Data Exchange 804 can include a fast Gigabit Ethernet (or faster) within a cabinet of a data center, or an intercontinental virtual area network (VLAN).

Users 800 access the remote services with respective client devices 820, which includes at least a CPU, a memory (not shown), a display and I/O. The client device can be a PC, a mobile phone, a netbook, tablet, gaming system, a PDA, etc. In one implementation, ISP 802 recognizes the type of device used by the client and adjusts the communication method employed. In other cases, client devices use a standard communications method, such as HTML, to access ISP 802.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present implementations are to be considered as illustrative and not restrictive, and the invention is not to be limited to the details given herein, but may be modified within the scope and equivalents of the described implementations.

An exemplary overall system architecture of a gaming console is described herein. An example gaming console may include a Sony® Playstation 3® (PS3) or a Playstation 4® (PS4) entertainment device, which may be compatible with controllers for implementing an embodiment of the present invention. Although the PS3 gaming console system architecture is explained in detail, it should be noted that the various implementations described herein can be extended to system architecture of a different gaming console or computing device. A system unit is provided, with various peripheral devices connectable to the system unit. The system unit is similar to the cloud gaming system 300 of FIG. 1. The system unit comprises: a processor, which may be a 8 core processor, as in PS3, or a multi-core processor, as in PS4; a Rambus® dynamic random access memory (XDRAM) unit, as in PS3, or a graphics dynamic random access memory, such as a GDDR5, as in PS4; a Reality Synthesizer graphics unit (e.g., 550 MHz GPU) with a dedicated video random access memory (VRAM) unit, as in PS3, or 800 or 900 MHz GPU with shared graphics memory in PS4 and PS4 Pro; and an I/O bridge. The system unit also comprises a Blu Ray® Disk Read Only Memory (BD-ROM®) (optical) disk reader for reading from a disk and a removable slot-in hard disk drive (HDD), accessible through the I/O bridge. Optionally the system unit also comprises a memory card reader for reading compact flash memory cards, Memory Stick® memory cards and the like, which is similarly accessible through the I/O bridge and in PS4, a built-in DVR to record games.

The I/O bridge also connects to six Universal Serial Bus (USB) 2.0 ports; a gigabit Ethernet port; an IEEE 802.11b/g wireless network (Wi-Fi) port; and a Bluetooth® wireless link port capable of supporting of up to seven Bluetooth connections.

In operation the I/O bridge handles all wireless, USB and Ethernet data, including data from one or more game controllers (Dual Shock 3 controller, as in PS3, or a PS4 Dual Shock 4 controller, as in PS4, etc.). For example when a user is playing a game, the I/O bridge receives data from the game controller via a Bluetooth link and directs it to the processor (in PS3) or multi-core processor (in PS4), which updates the current state of the game accordingly. Further, other image and move sensors provide data captured during game play of the user, to the I/O bridge, which directs it to the respective processor. The game controllers (e.g., game controllers of PS4) include a share button option for sharing a game, a clickable touchpad, a rechargeable battery (lithium-ion or other type), etc.

The wireless, USB and Ethernet ports also provide connectivity for other peripheral devices in addition to game controllers, such as: a remote control; a keyboard; a mouse; a portable entertainment device such as a Sony Playstation Portable® entertainment device; a video camera such as an EyeToy® video camera; a microphone headset; and a removable hard drive. Such peripheral devices may therefore in principle be connected to the system unit wirelessly; for example the portable entertainment device may communicate via a Wi-Fi ad-hoc connection, whilst the microphone headset may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader may be connected to the system unit via a USB port, enabling the reading of memory cards of the kind used by the Playstation® or Playstation 2® devices.

In the present implementation, the game controller is operable to communicate wirelessly with the system unit via the Bluetooth link. However, the game controller can instead be connected to a USB port, thereby also providing power by which to charge the battery of the game controller. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control is also operable to communicate wirelessly with the system unit via a Bluetooth link. The remote control comprises controls suitable for the operation of the Blu Ray™ Disk BD-ROM reader and for the navigation of disk content.

The Blu Ray™ Disk BD-ROM reader is operable to read Compact Disc, read only memory (CD-ROMs) compatible with the Playstation and PlayStation 2 devices, in addition to conventional pre-recorded and recordable compact discs (CDs), and so-called Super Audio CDs. The Blu Ray™ Disk BD-ROM reader is also operable to read Digital versatile disc-read only memory (DVD-ROMs) compatible with the Playstation 2™ and PlayStation 3™ devices, in addition to conventional pre-recorded and recordable DVDs. The Blu Ray™ Disk BD-ROM reader is further operable to read BD-ROMs compatible with the Playstation 3 device, as well as conventional pre-recorded and recordable Blu-Ray Disks.

The system unit is operable to supply audio and video, either generated or decoded by the Playstation 3 or Playstation 4 device via the Reality Synthesizer graphics unit, through audio and video connectors to a display and sound output device such as a monitor or television set having a display and one or more loudspeakers. The audio connectors may include conventional analogue and digital outputs whilst the video connectors may variously include component video, S-video, composite video and one or more High Definition Multimedia Interface (HDMI) outputs. Consequently, video output may be in formats such as PAL or NTSC, or in 720p, 1080i or 1080p high definition and 4K, HDR.

Audio processing (generation, decoding and so on) is performed by the Processor. For example, the Playstation 3 device's operating system supports Dolby® 5.1 surround sound, Dolby® Theatre Surround (DTS), and the decoding of 7.1 surround sound from Blu-Ray® disks.

In the present implementation, the video camera includes a CMOS (Complementary Metal Oxide Semiconductor) image sensor (although a charge-coupled device (CCD) image sensor may also be used), an LED indicator, and hardware-based real-time data compression and encoding apparatus so that compressed video data may be transmitted in an appropriate format such as an intra-image based MPEG (motion picture expert group) standard for decoding by the system unit. The camera LED indicator is arranged to illuminate in response to appropriate control data from the system unit, for example to signify adverse lighting conditions. Implementations of the video camera may variously connect to the system unit via a USB, Bluetooth or Wi-Fi communication port. Implementations of the video camera may include one or more associated microphones and also be capable of transmitting audio data. In implementations of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit, an appropriate piece of software such as a device driver should be provided. Device driver technology is well-known and will not be described in detail here, except to say that the skilled man will be aware that a device driver or similar software interface may be required in the present implementation described.

The Processor has an architecture comprising four basic components: external input and output structures comprising a memory controller and a dual bus interface controller; a main processor referred to as the Power Processing Element; eight co-processors referred to as Synergistic Processing Elements (SPEs); and a circular data bus connecting the above components referred to as the Element Interconnect Bus. The total floating point performance of the Processor is 218 GFLOPS, compared with the 6.2 GFLOPs of the Playstation 2 device's Emotion Engine.

The Power Processing Element (PPE) is based upon a two-way simultaneous multithreading Power compliant PowerPC core (PPU) running with an internal clock of 3.2 GHz. It comprises a 512 kB level 2 (L2) cache and a 32 kB level 1 (L1) cache. The PPE is capable of eight single position operations per clock cycle, translating to 25.6 GFLOPs at 3.2 GHz. The primary role of the PPE is to act as a controller for the Synergistic Processing Elements, which handle most of the computational workload. In operation the PPE maintains a job queue, scheduling jobs for the Synergistic Processing Elements and monitoring their progress. Consequently each Synergistic Processing Element runs a kernel whose role is to fetch a job, execute it and synchronized with the PPE.

Each Synergistic Processing Element (SPE) comprises a respective Synergistic Processing Unit (SPU), and a respective Memory Flow Controller (MFC) comprising in turn a respective Dynamic Memory Access Controller (DMAC), a respective Memory Management Unit (MMU) and a bus interface (not shown). Each SPU is a RISC processor clocked at 3.2 GHz and comprising 256 kB local RAM, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU does not directly access the system memory XDRAM 1426; the 64-bit addresses formed by the SPU are passed to the MFC which instructs its DMA controller to access memory via the Element Interconnect Bus and the memory controller.

The Element Interconnect Bus (EIB) is a logically circular communication bus internal to the Processor which connects the above processor elements, namely the PPE, the memory controller, the dual bus interface and the 8 SPEs, totaling 12 participants. Participants can simultaneously read and write to the bus at a rate of 8 bytes per clock cycle. As noted previously, each SPE comprises a DMAC for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz (giga hertz).

The memory controller comprises an XDRAM interface, developed by Rambus Incorporated. The memory controller interfaces with the Rambus XDRAM 1426 with a theoretical peak bandwidth of 25.6 GB/s.

The dual bus interface comprises a Rambus FlexIO® system interface. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Processor and the I/O Bridge via controller and the Reality Synthesizer graphics unit via controller.

Data sent by the Processor to the Reality Synthesizer graphics unit will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's experience. For example, computer generated costumes can be inserted over the user's clothing, and computer generated light sources can be utilized to project virtual shadows within a video scene. Hence, using the embodiments of the present invention and a depth camera, users can experience an interactive environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

The invention claimed is:

1. A system for processing data of an online game, comprising:
   a server configured for executing an instance of the online game and generate frames of data for transmitting to a client device;
   an encoder configured to receive the frames of data of the online game and encode the frames of data in accordance to a maximum data limit specified for a communication channel;
   the communication channel established between the server executing the online game and the client device for transmitting the frames of data for rendering; and
   a monitoring system coupled to the encoder and configured to,
   monitor amount of data included in each of the frames forwarded to the encoder,
   determine a number of subsequent frames from which to recoup excess data transmitted in a particular frame that exceeds the maximum data limit, and
   generate a signal to the encoder to dynamically reduce the amount of data included in each of the number of subsequent frames to a reduced maximum data limit defined based on demands of the online game and an amount of data exceeding the maximum data limit so as to maintain a frame rate for the online game,
   the monitoring system establishing a communication connection with the server to obtain access to the frames of data of the online game.

2. The system of claim 1, wherein the monitoring system includes,
   a bitrate monitor configured to examine each frame to determine amount of data included in each frame encoded by the encoder for onward transmission to the client device and to interact with a debt tracker when the particular frame includes data that exceeds the maximum data limit specified for the communication channel;
   the debt tracker is configured to track amount of excess data included in the particular frame, and a number of subsequent frames generated after the particular frame for which data needs to be dynamically reduced; and
   a bitrate adjuster configured to receive indication of the excess data included in the particular frame sent to the client device, from the bitrate monitor and to responsively instruct the encoder to dynamically reduce the amount of data included in the number of subsequent frames to a reduced maximum data limit.

3. The system of claim 2, wherein the encoder is configured to,
   receive a first signal from the bitrate adjuster indicating excess amount of data included in the particular frame, the first signal specifying the reduced maximum data limit of data for each subsequent frame and the number of subsequent frames for which the amount of data has to be reduced; and
   reduce the data identified for inclusion in each subsequent frame, in accordance to the reduced maximum data limit specified in the first signal from the bitrate adjuster.

4. The system of claim 2, wherein the bitrate monitor interacts with the debt tracker to obtain the number of subsequent frames following the particular frame for which the amount of data needs to be dynamically reduced, the number of subsequent frames being dynamically updated by the bitrate monitor after transmission of each subsequent frame to the client device, and
   the bitrate adjuster interacts with the bitrate monitor to obtain a current number of subsequent frames for which the data needs to be reduced, and when the current number of subsequent frames is non-zero, initiate the first signal to the encoder to dynamically reduce the data in the subsequent frame that is to be encoded for transmission to the client device.

5. The system of claim 4, wherein the debt tracker includes a frame counter for keeping track of the current number of subsequent frames for which the data needs to be dynamically reduced.

6. The system of claim 5, wherein the bitrate monitor is further configured to provide an indicator to the bitrate adjuster when the frame counter reaches zero; and
   the bitrate adjuster is further configured to send a second signal to the encoder to resume encoding the subsequent frames with data at the maximum data limit.

7. The system of claim 2, wherein the encoder is further configured to, determine if the amount of data included in a subsequent frame of the one or more subsequent frames received after the particular frame, exceeds the reduced maximum data limit;

when the subsequent frame exceeds the reduced maximum data limit, evaluate the data of the subsequent frame to identify portions of data that are critical for constructing an image included within the subsequent frame and discarding other data that is not critical for constructing the image within the frame.

8. The system of claim 1, further including a frame data processor, the frame data processor is configured to,
receive a frame of data from the online game;
analyze the data contained in the frame to understand complexity of the data contained in the frame; and
provide information related to the complexity of the data contained in the frame to the encoder, wherein the information is used by the encoder to determine specific portions of data in the frame to retain and specific other portions of data in the frame to discard.

9. The system of claim 1, further including a frame data processor, the frame data processor is configured to,
receive a frame of data from the online game;
analyze the data contained in the frame to understand complexity of the data contained in the frame; and
adjust the data contained in the frame to reduce complexity of the frame, the adjusted frame of data forwarded to the encoder for encoding.

10. The system of claim 9, wherein the adjusted frame of data is used by the encoder to determine specific portions of data to retain and specific other portions of data to discard.

11. The system of claim 1, wherein the maximum data limit is defined based on available bandwidth of the communication channel established between the client device and the server.

12. The system of claim 1, wherein the monitoring system engages artificial intelligence to monitor amount of data included in each of the frames, determine a number of subsequent frames to dynamically reduce the amount of data, and to generate the signal to dynamically reduce the amount of data for the number of subsequent frames.

13. A method, comprising:
receiving a frame of data generated for an online game from a server device, the frame of data including information representing a current state of the online game;
verifying if a previously encoded frame of data exceeded a maximum data limit specified for a communication channel established between the server device and a client device;
when the previously encoded frame is determined to have exceeded the maximum data limit, dynamically reducing amount of data included in the frame to a reduced maximum data limit prior to encoding the frame of data to generate encoded frame of data, the reduced maximum data limit defined based on demands of the online game; and
forwarding the frame of data encoded in accordance to the reduced maximum data limit to the client device over the communication channel so as to maintain a frame rate and updating the amount of data that still needs to be recouped and a number of subsequent frames of data required to recoup excess data,
wherein operations of the method are performed by a monitoring engine executing on the server device.

14. The method of claim 13, wherein the verifying includes,
querying a debt counter maintained for a current session of the online game to obtain a number of frames generated subsequent to the previously encoded frame for which amount of data needs to be dynamically reduced and an amount by which the previously encoded frame of data exceeded the maximum data limit; and
when the frame was generated within the number of frames subsequent to the previous encoded frame for which data needs to be dynamically reduced, providing a signal to the encoder to dynamically reduce the amount of data included in the frame.

15. The method of claim 14, wherein when the number of frames that needs to be dynamically reduced is zero, providing a second indicator to the encoder to resume encoding the frame of data at the maximum data limit.

16. The method of claim 13, wherein the data included in the frame is dynamically reduced upon verifying that the amount of data contained within the frame exceeds the reduced maximum data limit.

17. The method of claim 13, wherein the verifying of the previously encoded frame of data and dynamically reducing the amount of data is performed using artificial intelligence.

18. The method of claim 13, wherein the frame of data received for encoding immediately succeeds the previously encoded frame of data or is within a number of frames generated subsequent to the previously encoded frame of data determined for recouping the excess data transmitted in the previously encoded frame.

\* \* \* \* \*